(12) United States Patent
Frost et al.

(10) Patent No.: US 11,707,412 B2
(45) Date of Patent: Jul. 25, 2023

(54) GLASS VIAL WITH INCREASED CHEMICAL STABILITY

(71) Applicant: SCHOTT Pharma AG & Co. KGaA, Mainz (DE)

(72) Inventors: Robert Frost, Eggersriet (CH); Uwe Rothhaar, Birkenheide (DE); Florence Buscke, Mainz (DE); Bernhard Hladik, Alzey (DE)

(73) Assignee: SHOTT Pharma AG & Co. KGaA, Mainz (DE)

(*) Notice: Subject to any disclaimer, the term of this patent is extended or adjusted under 35 U.S.C. 154(b) by 326 days.

(21) Appl. No.: 16/992,798

(22) Filed: Aug. 13, 2020

(65) Prior Publication Data
US 2020/0368108 A1    Nov. 26, 2020

Related U.S. Application Data

(63) Continuation of application No. PCT/EP2019/052926, filed on Feb. 6, 2019.

(30) Foreign Application Priority Data

Feb. 23, 2018    (DE) .................. 10 2018 104 164.0

(51) Int. Cl.
*B65D 1/02*    (2006.01)
*C03C 17/30*    (2006.01)
(Continued)

(52) U.S. Cl.
CPC .............. *A61J 1/1468* (2015.05); *A61J 1/065* (2013.01); *C03B 9/335* (2013.01); *C03C 3/089* (2013.01)

(58) Field of Classification Search
CPC combination set(s) only.
See application file for complete search history.

(56) References Cited

U.S. PATENT DOCUMENTS 6,794,323 B2    9/2004    Peuchert et al.
9,919,950 B2    3/2018    Kass et al.
(Continued)

FOREIGN PATENT DOCUMENTS

DE    20 2016 005 820 U1    1/2017
EP       2 119 512 A1    11/2009
(Continued)

OTHER PUBLICATIONS

European Office Action dated Mar. 2, 2022 for European Patent Application No. 19 706 244.1 (4 pages).
(Continued)

*Primary Examiner* — Ellen S Hock
(74) *Attorney, Agent, or Firm* — Taylor IP, P.C.

(57) ABSTRACT

A glass vial includes a base including a boron-containing multicomponent glass and a vial opening and holds a liquid active pharmaceutical ingredient formulation. The glass vial has a total volume of <4.5 mL. A filling level of the glass vial with the active pharmaceutical ingredient formulation is not more than 0.25 and a concentration of boron ions, measured at a measurement site below a plane of a middle of the glass vial using a concentration depth profile at a depth in a range from 10 to 30 nm, has a value, averaged over the measurements of the concentration depth profile, that has an excess increase of not more than 30% compared to a concentration of boron ions measured using a concentration depth profile at a depth in a range from 10 to 30 nm with a measurement site in the plane of the middle of the glass vial.

19 Claims, 15 Drawing Sheets

(51) Int. Cl.
  *A61J 1/14* (2023.01)
  *A61J 1/06* (2006.01)
  *C03B 9/335* (2006.01)
  *C03C 3/089* (2006.01)

(56) References Cited

U.S. PATENT DOCUMENTS

2010/0255229 A1  10/2010  Wada
2014/0323287 A1  10/2014  Tratzky et al.

FOREIGN PATENT DOCUMENTS

JP    63-170233 A    7/1988
JP    2013-047111 A  3/2013

OTHER PUBLICATIONS

Chinese Office Action dated Mar. 23, 2022 for Chinese Patent Application No. 201980015130.3 (12 pages).
Indian Office Action dated Sep. 29, 2022 for Indian Application No. 202017039921 (7 pages).
Notification of the Transmission of the International Search Report and Written Opinion of the International Search Authority or Declaration dated Jun. 5, 2019 for International Application No. PCT/EP2019/052926 (14 pages).
Partial English translation of Japanese Patent No. 63-170233 (1 page).
Partial English translation of Japanese Patent No. 2013-047111 (2 pages).

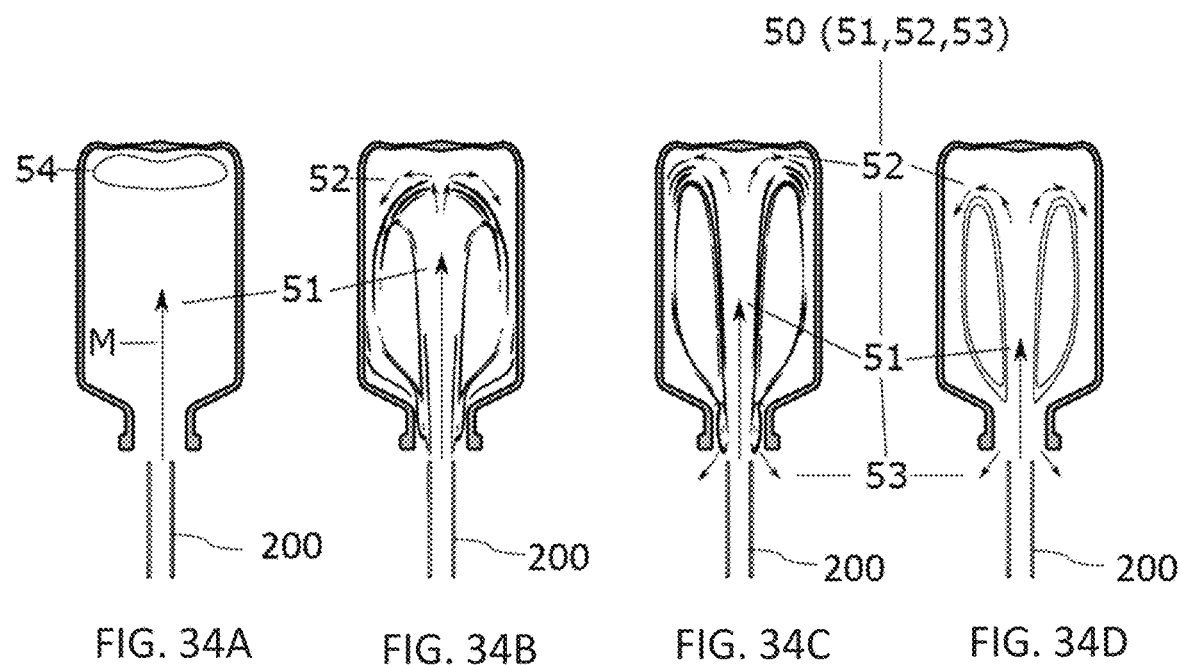
FIG. 34A　　FIG. 34B　　FIG. 34C　　FIG. 34D
FIG. 35
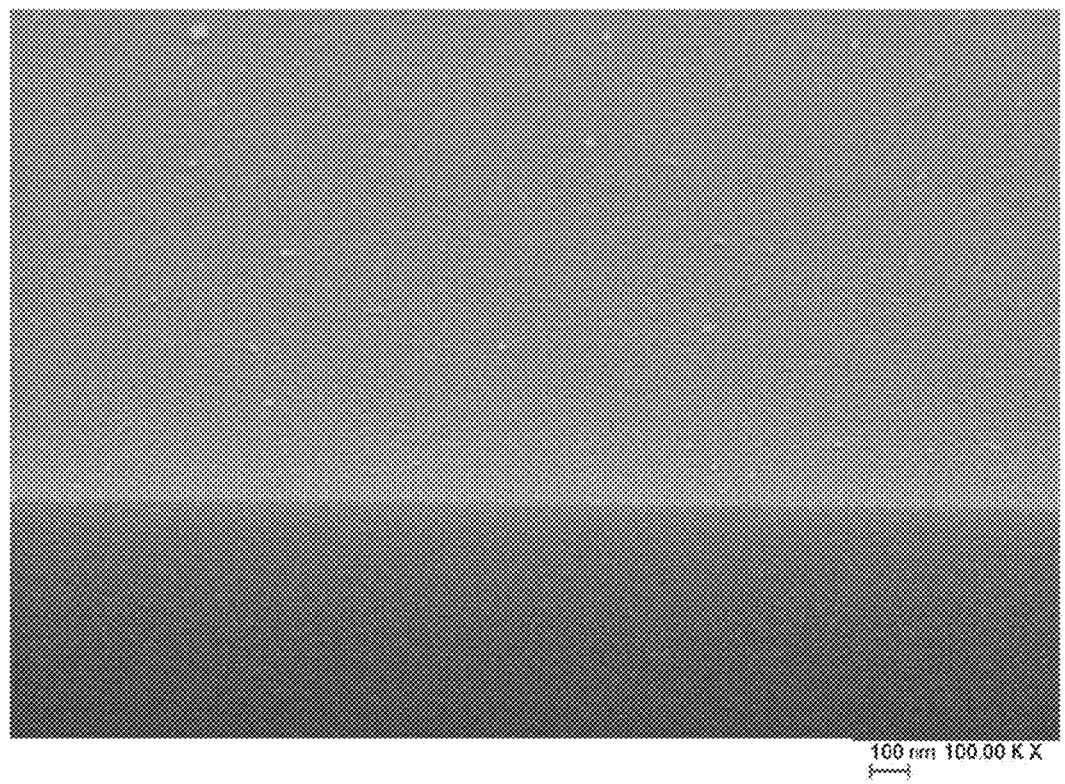

GLASS VIAL WITH INCREASED CHEMICAL STABILITY

CROSS REFERENCE TO RELATED APPLICATIONS

This is a continuation of PCT Application No. PCT/EP2019/052926, entitled "SMALL GLASS BOTTLE HAVING INCREASED CHEMICAL RESISTANCE", filed Feb. 6, 2019, which is incorporated herein by reference. PCT Application No. PCT/EP2019/052926 claims the priority of German Patent Application DE 10 2018 104 164.0 filed Feb. 23, 2018, which is incorporated herein by reference.

BACKGROUND OF THE INVENTION

1. Field of the Invention

In general terms, the present invention relates to glass vials for storage of active pharmaceutical ingredients. Specifically, the present invention relates to glass vials that can also be used for storage of small amounts of active pharmaceutical ingredients, where the efficacy of the active pharmaceutical ingredients changes only to a very minor degree, if at all, during storage in the glass vial.

2. Description of the Related Art

Some active pharmaceutical ingredients, for example therapeutic proteins, and active ingredients produced by biotechnology, for example monoclonal antibodies and vaccines, are frequently administered in very small amounts. The corresponding fill volumes are generally significantly smaller than the nominal volumes of the smallest primary packaging media made of neutral glass that are available on the market.

The nominal volume is understood here to mean the product volume, for example the volume of an active pharmaceutical ingredient formulation that should be present in the corresponding packaging medium if it is completely filled. This should be distinguished from what is called the volume to rim, which corresponds to a fill level of the corresponding packaging medium up to its rim. In general, the nominal volume is less than the volume to rim. Frequently, the volume to rim is 1.5 to 2.5 times the nominal volume.

Useful available packaging media in principle include syringes, carpules and vials, i.e. glass vials. However, syringes and carpules have a silicone-containing slide layer on their inner glass surface in order to enable the rubber stopper to slide on emptying. However, particularly the abovementioned active pharmaceutical ingredients undergo a deactivating interaction with the slide layer, and so syringes and carpules for pharmaceutical formulations comprising these active ingredients cannot be used as primary packaging media.

Therefore, what are called neutral glass vials are used as primary packaging media. They are closed with caps that do not have any deleterious release of material and are stored upright. In particular, glass vials made of what is called type I neutral glass (according to EP 3.2.1 or USP 660) are used, which are produced by a hot forming process as tubular glass vials.

If the active pharmaceutical ingredient is being introduced into the vial in a suitable buffer solution, for example, it may be the case that a portion of the pharmaceutical formulations packaged in the vials is stable over the entire storage period while another portion of the formulations has reduced efficacy as a result of too high a migration load.

The different migration load within a batch also means that storage studies and random samples are not conclusive.

In order to avoid the abovementioned disadvantages, the prior art discloses the use of type 1 neutral glass vials which, as a result of an ammonium sulfate treatment, have greatly reduced and substantially uniform release of alkali metal ions. As a result of the treatment with ammonium sulfate, mobile alkali metal ions, i.e. those not firmly incorporated into the glass, are removed from the near-surface glass layers up to about 50 µm. However, an ammonium sulfate treatment cannot prevent migration of non-alkali metal constituents and diffusion of glass constituents to the glass surface and subsequent migration into the contents during the storage time. A further disadvantage of ammonium sulfate treatment lies in damage to the glass surface as a result of the high temperatures that exist in the process and the associated reduction in chemical stability.

A further way of reducing the leaching-out of the above-described glass constituents which is described in the prior art lies in inner coating of the glass vials with an $SiO_2$ coating. As well as the high production costs, however, the limited stability of the quartz glass coatings at pH values in the alkaline range is also disadvantageous. The abovementioned problems are aggravated when the glass vial is not filled completely since the ratio of wetted surface area to fill volume rises.

What is needed in the art are glass vials which can be used as pharmaceutical packaging media even for very small fill volumes and which do not have the disadvantages described above. More particularly, a pharmaceutical packaging medium for pharmaceutical formulations that reliably rules out impairment of the action of the contents within the planned storage period and additionally has reliable homogeneity of the chemical properties throughout the respective production batch is needed.

SUMMARY OF THE INVENTION

Some exemplary embodiments provided according to the present invention provide a glass vial which, even without inner coatings, by virtue of the configuration of the glass on the inside, reduces the migration of unwanted impurities and can be used correspondingly as pharmaceutical packaging medium.

In some exemplary embodiments provided according to the present invention, a glass vial includes a base and a vial opening, the base including a boron-containing multicomponent glass, the glass vial holding a liquid active pharmaceutical ingredient formulation. The glass vial has a total volume of <4.5 mL and a filling level of the glass vial with the active pharmaceutical ingredient formulation is not more than 0.25. A concentration of boron ions, measured at a measurement site below a plane of a middle of the glass vial using a concentration depth profile at a depth in a range from 10 to 30 nm, has a value, averaged over measurements of the concentration depth profile, that has an excess increase of not more than 30% compared to a concentration of boron ions measured using a concentration depth profile at a depth in a range from 10 to 30 nm with a measurement site in the plane of the middle of the glass vial, where the position of the plane of the middle of the glass vial is determined from an underside of the base of the glass vial in a direction of the vial opening.

In some exemplary embodiments provided according to the present invention, a glass vial includes a base, a side wall connected to the base, and a vial opening. The base and the side wall include a multicomponent glass. The glass vial holds a liquid active pharmaceutical ingredient formulation. The glass includes $SiO_2$. The glass vial has a total volume of <4.5 mL and a filling level of the glass vial with the active pharmaceutical ingredient formulation is not more than 0.25. The glass at the base at an inner wall has a composition having a higher $SiO_2$ content than at the side wall and at a transition of the side wall to the base.

In some exemplary embodiments provided according to the present invention, a method of forming a glass vial includes: locally heating one end of a glass tube; removing the locally heated end of the glass tube to form the glass vial having a closed base; and further forming the base of the glass vial. The further forming includes generating a purge gas flow within the formed glass vial with the aid of a purge gas.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 34A to FIG. 34D illustrates a schematic diagram of four phases of the blowing operation in a process for producing glass vials according to the present invention;

FIG. 35 is an SEM cross-sectional image of the near-base region of a glass vial provided according to the present invention;

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
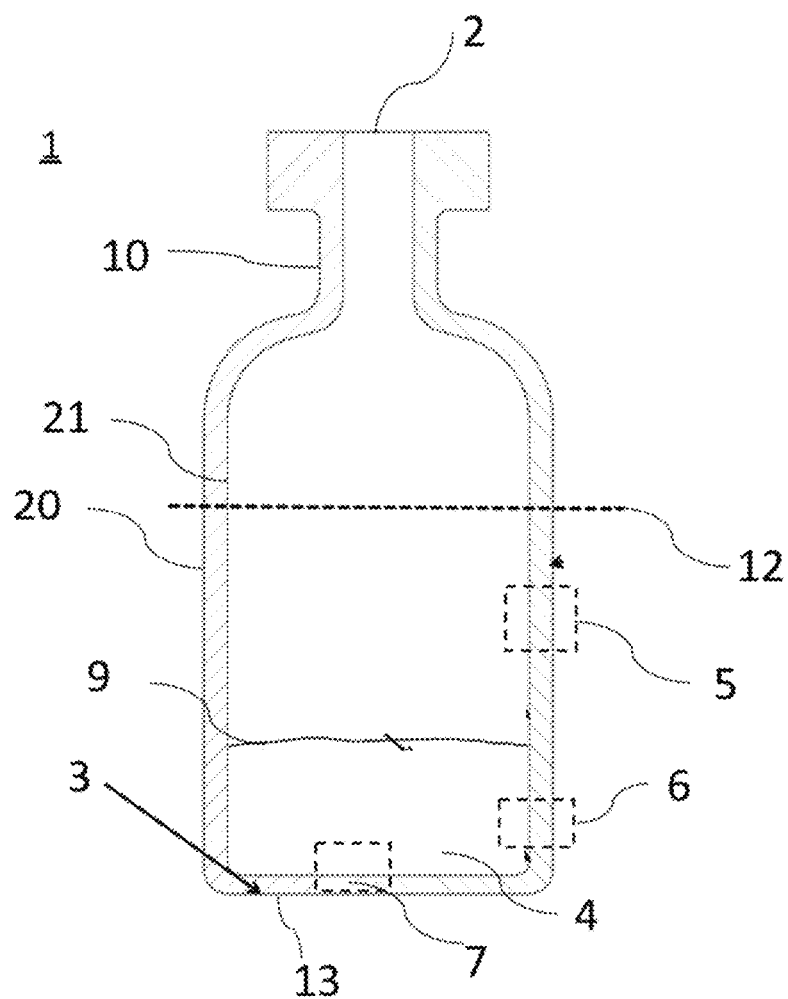
FIG. 1 is a schematic diagram of a glass vial.
Figure 2:
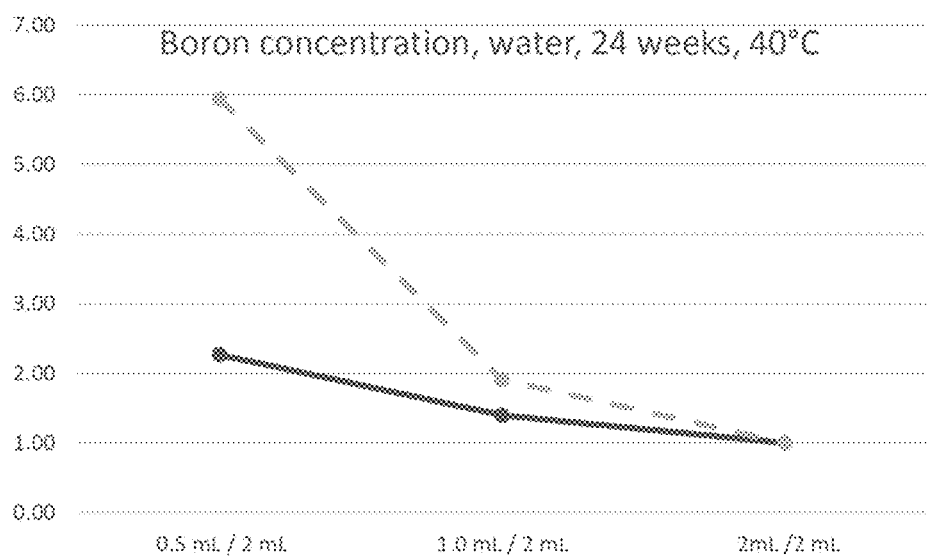
FIG. 2 to FIG. 5 illustrate the leaching characteristics of a glass vial as a working example and of a glass vial known from the prior art for boron ions with different liquids as leaching medium.
Figure 3:
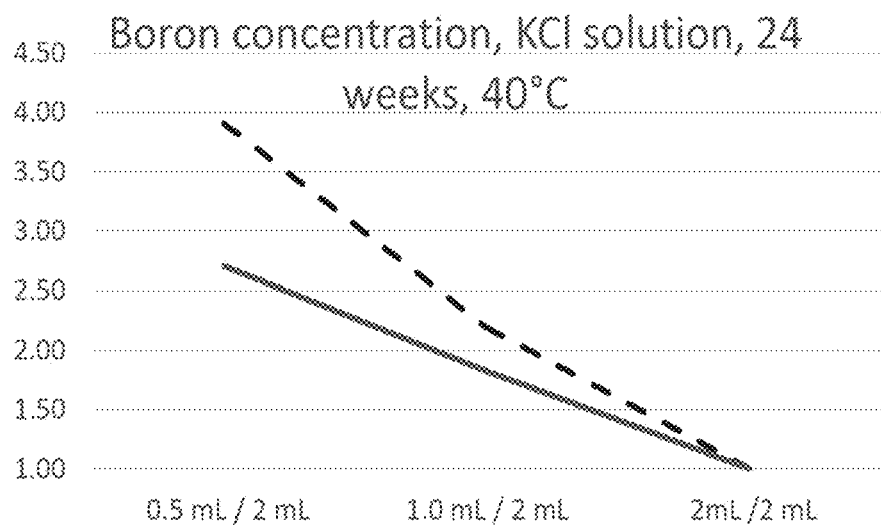
Figure 4:
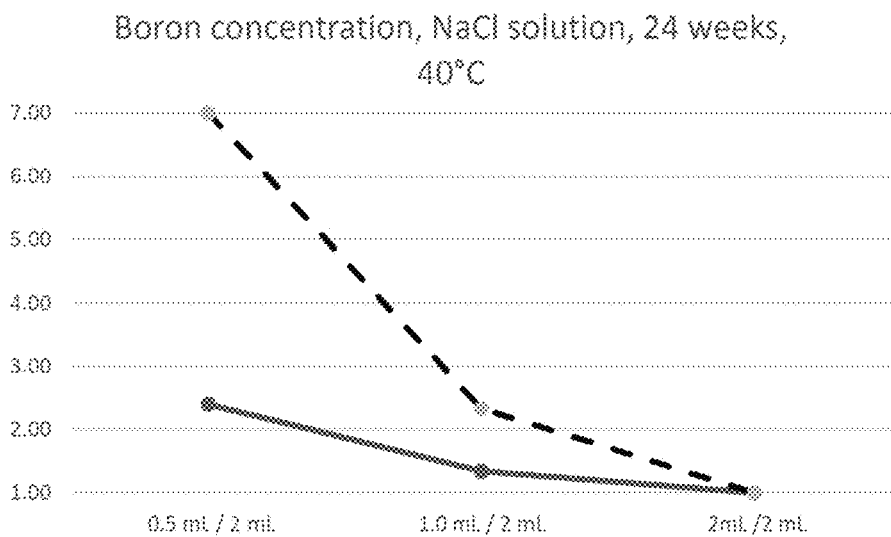
Figure 5:
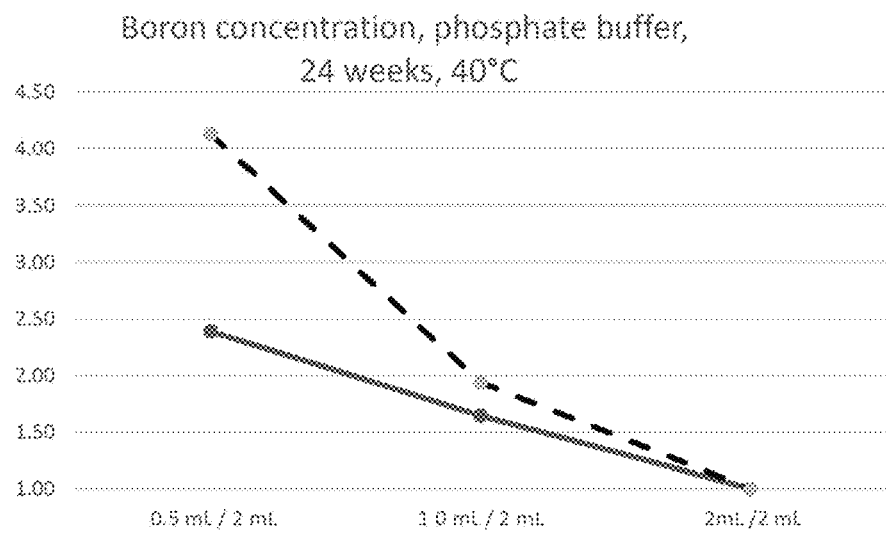
Figure 6:
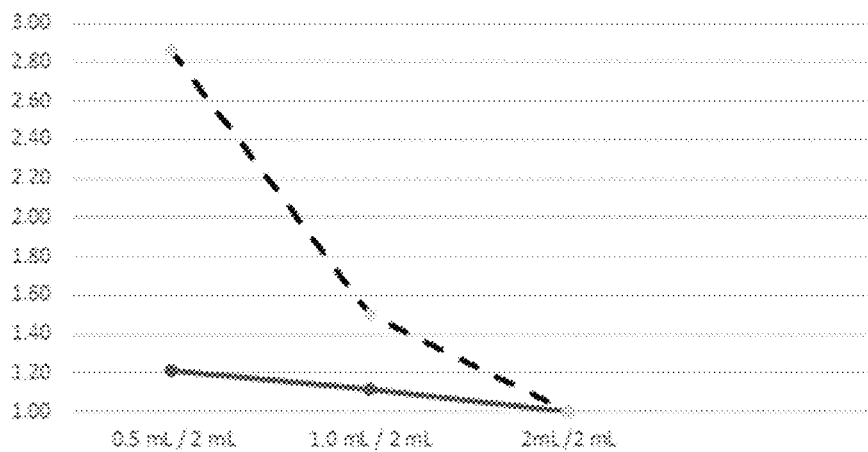
FIG. 6 to FIG. 10 illustrate leaching characteristics with regard to silicon ions with different liquids as leaching medium.
Figure 7:
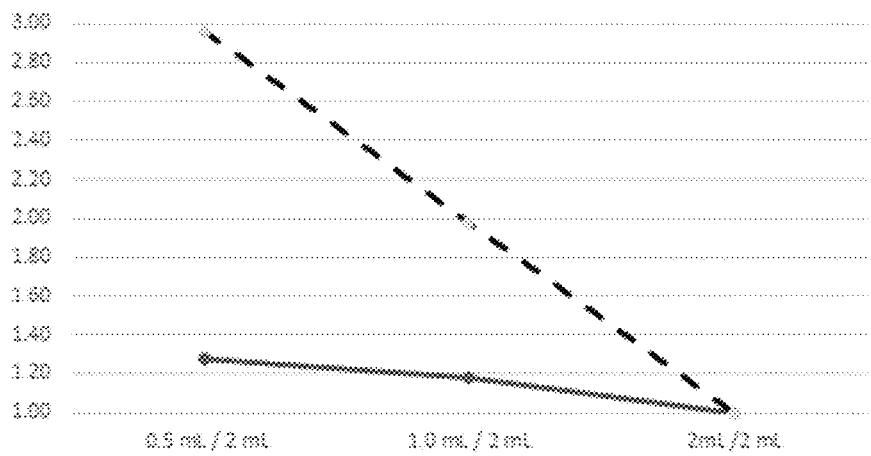

One aspect of the present invention is a glass vial having a total volume of <4.5 mL made of a multicomponent glass with a liquid pharmaceutical formulation up to a filling level of not more than 0.25. The total volume of <4.5 mL is understood here to mean the volume to the rim of the glass vial.

The filling level of the glass vial is accordingly found from the ratio of the filling volume, i.e. the volume of the pharmaceutical formulation in the glass vial, and the volume to the rim of the glass vial. A multicomponent glass in the context of the present invention is understood to mean a glass which, as well as $SiO_2$, includes at least one further glass constituent. A constituent, in the context of the present invention, is especially understood to mean a chemical element present in the glass at at least 1% of the total weight.

In the production of glass vials from a glass tube, the glass tube is processed by hot forming so as to form a base. In the production process, the glass regions that form the base and the near-base edge region experience the greatest increase in temperature and accordingly the greatest change in chemical composition. For example, corresponding borosilicate glasses after forming have a near-surface excess concentration of alkali metal ions and boron ions in the near-base wall region. Therefore, in these regions, in the case of conventional glass vials, quantitatively more glass constituents are released on contact with liquids than in the unformed cylindrical wall regions. The release of the glass constituents to the liquid is also referred to as leaching-out, it being possible for not only alkali metal ions but also further glass constituents such as boron, aluminum or silicon to be leached out. Glasses or glass regions with a high release of glass constituents to the liquid are correspondingly referred to as readily leaching. Especially the near-base wall region, on contact with a liquid, releases quantitatively more glass constituents to the liquid than the unformed regions. The leached-out glass constituents can interact with the contents of the (glass) vial and hence, for example, considerably reduce the stability and efficacy of pharmaceutical formulations.

In the case of borosilicate glasses, the migrated constituents are primarily the alkali metals Na, K and Ca and the glass constituents B, Al and Si. If Na, K and Ca migrate into the contents, they bring about a shift of the pH into the alkaline region. Through use of suitable buffer solutions, this shift in pH can be counteracted up to a certain point, but the shift in pH increases with storage time and is the most common problem in the case of products with small dispensation volumes. For instance, in the case of the glass vials known from the prior art, sufficient buffering is not achieved over the entire storage period in about half of all cases.

An additional factor is that the hot forming processes in the production of conventional vials, i.e. those known from the prior art, are frequently reproducible only with regard to the geometric specification of the vials. Thus, there is variation especially in the chemical composition of the glass surface in the near-base regions and hence also in the migration of glass constituents into a dispensed pharmaceutical formulation in qualitative and quantitative terms. The quantitative proportion of the leached-out constituents based on the volume of the liquid is referred to as migration load. Even vials within a batch can differ in relation to migration load.

The inner wall of the glass vial of the present invention has elevated hydrolysis stability compared to the prior art, i.e. chemical stability to leaching-out of at least one of the constituents of the multicomponent glass.

It has been found that, surprisingly, particularly high hydrolysis stability is achieved when there is an excess increase in the boron ion concentration within the glass, i.e. including in the unformed wall regions, of not more than 30% compared to an unformed wall region.

In some embodiments provided according to the present invention, a glass vial made of a boron-containing multicomponent glass has a liquid active pharmaceutical ingredient formulation and, in some embodiments, a seal. The glass vial has a total volume of <4.5 mL, the filling level of the glass vial with the active pharmaceutical ingredient formulation is not more than 0.25 and the concentration of boron ions, measured at a measurement site below the plane of the middle of the vessel using a concentration depth profile at a depth in the range from 10 to 30 nm, has a value, averaged over the measurements of the concentration depth profile, that has an excess increase of not more than 30% compared to a concentration of boron ions measured using a concentration depth profile at a depth in the range from 10 to 30 nm with a measurement site in the plane of the middle of the vessel, where the position of the plane of the middle of the vessel is determined from the underside of the base in the direction of the vial opening. In some embodiments, the excess increase in the concentration profile of the boron ions is in the range from 10% to 25%.

The concentration/depth profile at a depth in the range from 10 to 30 nm in a formed near-base wall region may have an excess increase of not more than 30% for boron ions compared to an upper unformed wall region. In some embodiments, the concentration/depth profile at a depth of 10 to 30 nm in a formed near-base wall region has an excess increase of not more than 25% or even just 20% for boron ions compared to an upper wall region.

The near-base wall region in the context of the present invention is understood to mean the region of the inner wall of the glass vial at a distance of 1 to 5 mm, such as 1 to 3 mm, from the outside, or underside, of the glass base. The upper unformed wall region may be at a distance of 8 to 20 mm, such as 10 to 15 mm, from the base of the glass vial.

The concentration/depth profile was determined by TOF secondary ion mass spectroscopy (TOF-SIMS) within the scope of ISO 17025 and specifically according to ISO 18116. For depth calibration, the analysis depth was determined via the sputtering time from the material removal rate. This material removal rate was determined on a reference glass. The outer 5 nm of the glass were not taken into account for the evaluation since surface contaminants and as yet incompletely developed charge/sputtering equilibria may exist here.

An excess increase in the boron concentration in the near-base regions is especially attributable to the fact that, in the forming process to produce the glass vials, owing to the high temperatures, glass constituents, especially borates, evaporate out of the base and then, owing to the temperature gradient between base and near-base wall regions, diffuse into the near-base wall regions and hence lead to an increase in the boron ion concentration in the near-surface glass layers.

This can have an adverse effect on the chemical stability and leaching characteristics of the glass in the near-base wall region since the elevated boron concentration in the near-surface glass layers can result in a miscibility gap in the phase diagram. This can result in a phase separation in the course of cooling of the near-surface glass layer. As well as lower mechanical stability, a phase separation can also lead to increased migration of glass constituents into the filling medium. This can proceed, for example, via weaker binding of individual glass constituents into the respective phase, which can lead to elevated mobility of the respective constituents.

In some exemplary embodiments provided according to the present invention, the glass vial has a plateau value for the concentration of boron ions in the near-base wall regions over and above a depth of 150 nm, such as over and above a depth of 100 nm or over and above a depth of 50 nm. A plateau value is especially understood to mean largely constant values that differ by not more than 20%, such as not more than 10%, from the average of the constant value for greater depths (>200 nm).

By virtue of the small excess increase, in accordance with the present invention, in the boron ion concentration and the concentration profile in the glass wall, a phase separation is avoided, and so the glass has high chemical and mechanical stability even in the near-base wall region. In some embodiments, the glass of the entire inner wall of the glass vial, i.e. in a near-base wall region as well, is monophasic down to a depth of at least 200 nm.

More particularly, the multicomponent glass is a borosilicate glass, such as a neutral glass. It has been found to be advantageous to use neutral glasses having a class I hydrolysis resistance. Neutral glass is understood to mean a borosilicate glass having significant proportions of $B_2O_3$, $Al_2O_3$, alkali metal oxides and/or alkaline earth metal oxides. Owing to their chemical composition, neutral glasses have high hydrolysis stability. Hydrolysis stability is understood here to mean stability to leaching-out of soluble glass constituents, especially of ions. The hydrolysis stability of the glass can be quantified, for example, by titration of the corresponding leached-out constituents in the leaching medium, i.e. in the liquid that has come into contact with the glass surface under the respective test conditions. A determination can be determined here on a glass surface of a corresponding (glass) vial or else on glass grains (ISO 719 or ISO 720).

It has been found to be useful to use a glass having the following constituents in % by weight:

| | |
|---|---|
| $B_2O_3$ | >8, such as 8-12 |
| $SiO_2$ | 65-85, such as 70-80 |
| $Na_2O + K_2O$ | 4-8 |
| $MgO + CaO + BaO + SrO$ | 0-5 |
| $Al_2O_3$ | 2-7 |

In some embodiments, the glass has a composition having the following constituents in % by weight:

| | |
|---|---|
| $B_2O_3$ | 10.5 |
| $SiO_2$ | 75 |
| $Na_2O + K_2O$ | 7 |
| $MgO + CaO + BaO + SrO$ | 1.5 |
| $Al_2O_3$ | 5 |

The glass vials described may be obtained, for example, with the aid of the production process that follows. The production process includes at least the following steps:
locally heating one end of a glass tube,
removing the locally heated end of the glass tube to form a glass vial having a closed base, and
further forming the base of the glass vial.

In this case, the glass vial formed, after being separated from the glass tube, may be held upside down and, in the further forming of the base, with the aid of a purge gas, a purge gas flow is generated within the glass vial. As a result, there is no diffusion of the borates into the glass surface of the near-base regions.

In some embodiments, the purge gas flows in or out centrally through the entry opening and out or in eccentrically, such that a backpressure develops. By virtue of this flow profile, borates that evaporate out of the base during the forming process are guided out of the glass vial particularly efficiently with the purge gas.

By virtue of the high chemical stability of the inner glass wall even in the near-base region, it is possible to dispense with further measures, for example an ammonium sulfate treatment or an etching process. In some embodiments, the surface of the inner wall likewise does not have any coating.

By virtue of its dissolution characteristics, especially owing to the specific properties of the glass surface in the near-base edge regions, the glass vial has only minor interactions with active pharmaceutical ingredients, for example therapeutic proteins, monoclonal antibodies or vaccines. In some embodiments, the active pharmaceutical ingredient formulation with which the glass vial has been filled therefore comprises therapeutic proteins, monoclonal antibodies and/or vaccines.

Alternatively, some exemplary embodiments provide glass vials made of a boron-containing multicomponent glass with a liquid active pharmaceutical ingredient formulation and a seal, the glass vial having a total volume of <4.5 mL, the filling level of the glass vial with the active pharmaceutical ingredient formulation is not more than 0.25 and the glass at the base at the inner wall has a composition having a higher $SiO_2$ content than at the side wall and at the transition thereof to the base.

In some embodiments, the concentration of silicon ions measured at a measurement site on the inside of the base of the glass vial is elevated by at least 10%, such as by at least 15%, compared to a measurement site in the plane of the middle of the vessel or an upper wall region. To determine the excess increase in concentration, a concentration/depth profile is created here at a depth in the range from 5 to 15 nm. The measurement data thus obtained are used to obtain the average, which is compared with the corresponding average from a measurement site in the middle of the vessel. The position of the plane of the middle of the vessel is determined from the underside of the base in the direction of the vial opening.

More particularly, an SIMS concentration/depth profile of the glass in the region of the base at a depth in the range from 5 to 15 nm has an excess increase for silicon ions of at least 10%, such as of at least 20%, compared to an upper wall region.

The concentration of $SiO_2$ in the base of the glass vial may be elevated here at least by a factor of 1.2 or even at least by a factor of 1.3 compared to the $SiO_2$ concentration in an upper wall region of the glass vial. The factor may be in the range of 1.1 and 1.4.

By virtue of the high silicon content, the base of the glass vial, surprisingly, has high chemical stability. The increase in the silicon content additionally correlates with depletion of the glass of other glass constituents. In the case of borosilicates, these are especially boron ions and alkali metal ions that evaporate out during the forming process to produce the base.

In some embodiments, the concentration of sodium ions averaged over the measurement values measured at a measurement site on the inside of the base using a concentration/depth profile at a depth in the range from 5 to 15 nm is smaller at least by a factor of 1.5, such as at least by a factor of 2 or at least by a factor of 2.5, than the correspondingly determined average of the sodium concentration at a measurement site in the plane of the middle of the vessel. The factor may be in the range of 1.6 and 2.2. In some embodiments, the SIMS depth profile of the glass in the region of the base at a depth in the range from 5 to 15 nm has a reduction for sodium ions of at least 20%, such as at least 40%, compared to an upper wall region. The concentration of sodium in the base of the glass vial may be reduced here especially at least by a factor of 1.5, at least by a factor of 1.8, or at least by a factor of 2.5 compared to the sodium concentration in an upper wall region of the glass vial.

In addition, the base of the glass vial may have a reduced calcium concentration compared to an upper wall region of the glass vial. More particularly, the average of the concentration ascertained by an SIMS concentration/depth profile for calcium, at a depth in the range from 10 to 30 nm, may have a reduction at the base of the glass vial of at least 20%, such as at least 30%, compared to the correspondingly ascertained average of the concentration in an upper wall region of the glass vial. More particularly, the concentration of calcium in the base of the glass vial may be reduced at least by a factor of 1.3 or at least by a factor of 1.6 compared to the calcium concentration in an upper wall region of the glass vial.

Alternatively or additionally, the base of the glass vial may have a reduced boron concentration compared to an upper wall region of the glass vial. More particularly, the SIMS depth profile for boron at a depth in the range from 10 to 30 nm may have a reduction for boron ions of at least 60%, such as at least 80%. For instance, the concentration of boron ions measured at a measurement site on the inside of the base using a concentration/depth profile at a depth in the range from 10 to 30 nm may have a value averaged over the measurements in the concentration/depth profile that has a reduction at least by a factor of 3, at least by a factor of 2, or at least by a factor of 5, compared to a concentration of boron ions measured using a concentration/depth profile at a depth in the range from 10 to 30 nm with a measurement site in the plane of the middle of the vessel, where the position of the plane of the middle of the vessel is determined from the underside of the base in the direction of the vial opening.

In these embodiments, the glass vial thus has an inhomogeneous concentration distribution of glass constituents based on the different regions of base, near-base wall region and upper wall region. This is advantageous since the base has a reduced concentration of glass constituents that can be leached out, such as boron, alkali metal ions or alkaline earth metal ions. Thus, the migration load that emanates from the base of the glass vial is also lower than the migration load from the other regions of the glass vial. In the case of low fill levels and in connection with the customary upright storage of the pharmaceutical packaging media, this positive effect has a particularly strong effect since the base here is constantly covered by the liquid, while only a small proportion of the wall surface comes into contact with the liquid.

In some embodiments, the glass vial with the pharmaceutical formulation has a seal, such as a sterile seal.

The high chemical stability of the glass vials provided according to the present invention leads to a low migration load by leaching-out processes. In some embodiments, the effect of this is that, in the event of leaching-out of glass constituents of the glass with an aqueous liquid having a pH in the range of 5 to 9 as leaching medium, the concentration of at least one leached-out constituent at a fill volume of 0.5 mL and the concentration at a fill volume of 2 mL is not more than 3, and the ratio between the concentration at a fill volume of 1 mL and the concentration at a fill volume of 2 mL is not more than 2. In this case, the respective amount of liquid used as leaching medium is added to the glass vial and the glass vial thus filled is stored upright at a temperature of 40° C. for a period of 24 weeks. After this storage time, the concentration of the leached-out glass constituent(s) in the leaching medium is determined. In particular, the water content of the liquid is at least 80% by volume.

For quantitative determination of the concentrations of the glass elements that have gone into solution, HR-ICP-MS (High Resolution Inductively Coupled Plasma Mass Spectrometry) and ICP-OES (Inductively Coupled Plasma-Optical Emission Spectroscopy) analyses were conducted.

In some embodiments, the ratio between the concentration of the leached-out glass constituent at a fill volume of 0.5 mL and the concentration at a fill volume of 2 mL is not more than 2.5, such as not more than 1.5, and the ratio between the concentration at a fill volume of 1 mL and the concentration at a fill volume of 2 mL is not more than 1.5. In some embodiments, the ratio between the concentration at a fill volume of 1 mL and the concentration at a fill volume of 2 mL is in the range from 1 to 1.8, such as from 1 to 1.5.

In the case of a fill volume of 0.5 mL, the liquid used as leaching medium, also referred to hereinafter merely as "liquid", predominantly covers the base and the near-base wall region of the glass vial and hence the regions of the glass vial that contribute the most to the migration load in the liquid. The leaching characteristics at a fill volume of 0.5 mL therefore permit conclusions about the migration load at a low filling level.

In the case of a fill volume of 2 mL, by contrast, the regions of the inner glass wall that have been affected only to a minor degree, if at all, in terms of their chemical composition by the forming process and hence contribute only to a very minor degree, if at all, to the migration load of liquid in the vial are also wetted by the liquid. With the fill volume of 2 mL, the leaching characteristics at a high filling level are thus obtained.

The ratio between the concentrations of a leached-out constituent at a fill volume of 0.5 mL and a fill volume of 2 mL thus makes clear the extent to which the migration load in the near-base regions has increased compared to the unformed wall regions. The quantitative proportion of the leached-out constituents based on the area of the glass wall wetted by the liquid is referred to as leaching intensity.

The concentration of a leached-out constituent ascertained for a fill volume corresponds by definition to the leaching intensity based on the fill volume and multiplied by the area wetted by the liquid. Thus, the ratio of the concentrations of a leached-out constituent corresponds to the ratio of the leaching intensities multiplied firstly by the ratio of the wetted areas and secondly multiplied by the reciprocal of the ratio of the fill volumes.

For a commercial tube glass vial having a nominal volume of 2 mL and a typical internal diameter of about 14 mm, for example, the ratio of the wetted area at a fill volume of 0.5 mL to the wetted area at a fill volume of 2 mL is found to be a value of about 0.4. For such a vial, therefore, a ratio of the concentrations of a leached-out constituent at the fill volume of 0.5 mL and a fill volume of 2 mL greater than 1.6 (0.4 multiplied by the reciprocal of the fill volumes) means that the leaching power (based on the respective glass constituent) in the near-base wall regions is greater than the leaching power in the unformed wall regions. At a ratio of 1.6, the two wall regions of the vial have no difference in terms of their leaching characteristics (based on the glass constituent determined in each case in the respective medium). At a ratio less than 1.6, the leaching power at a fill volume of 0.5 mL is actually less than at a fill volume of 2 mL.

The concentration ratios of the development of the present invention thus correspond to small differences in leaching characteristics between the two regions. Thus, it is also possible to store pharmaceutical formulations in very much smaller doses than would correspond, for example, to the nominal volume of the glass vial in the glass vials since the effects on the active pharmaceutical ingredients in the near-base wall regions that occur as a result of the migration of the glass constituents, owing to the specific characteristics of the inner glass wall in these regions, differ only slightly from those in unformed wall regions.

In some embodiments, after a storage time of 48 weeks, the ratio between the concentration of the leached-out constituent at a fill volume of 0.5 mL and the concentration at a fill volume of 2 mL lies not more than 2.5, such as not more than 1.5, and the ratio between the concentration at a fill volume of 1 mL and the concentration at a fill volume of 2 mL lies not more than 1.8, such as not more than 1.5. In some embodiments, the ratio between the concentration at a fill volume of 0.5 mL and the concentration at a fill volume of 2 mL is in the range from 1 to 1.8 and the ratio between the concentration at a fill volume of 1 mL and the concentration at a fill volume of 2 mL is in the range from 1 to 1.5.

In some embodiments, the leaching medium used to determine the migration load is processed water. Processed water in the context of the present invention is especially understood to mean water from which a majority of the substances present in water in the unprocessed state have been removed by ion exchange and/or distillative methods. For example, the processed water may be demineralized water or distilled water.

TABLE 1

| ICP results for processed water as leaching medium | | | | | |
|---|---|---|---|---|---|
| | B [mg/l] | Na [mg/l] | Al [mg/l] | Si [mg/l] | Ca [mg/l] |
| Processed water | <0.005 | <0.01 | <0.005 | 0.008 ± 15% | <0.005 |
| Determination limit | 0.005 | 0.01 | 0.005 | 0.005 | 0.005 |

Table 1 shows the proportions of extraneous substances in the water used as leaching medium, determined by ICP analysis, prior to contact with the glass. In the case of Na, B, Ca and Al, these values are below the determination limits that are possible here.

Alternatively, the leaching medium used may be a 15% KCl solution. In this case, the respective volume of the KCl solution is added to the glass vial and stored at 40° C. for a period of 24 weeks. In some embodiments, the leaching medium used here is a KCl solution having the concentrations shown in Table 2 (measured by ICP analysis prior to contact with the glass vial).

TABLE 2

| ICP results for KCl solution | | | | | |
|---|---|---|---|---|---|
| Blank solution | B [mg/l] | Na [mg/l] | Al [mg/l] | Si [mg/l] | Ca [mg/l] |
| 15% KCl | <0.20 | 1.3 ± 15% | <0.20 | <0.30 | <0.20 |
| Determination limit | 0.20 | 0.20 | 0.20 | 0.30 | 0.20 |

After a storage time of 24 weeks and a 15% KCl solution as leaching medium, the ratio between the concentration of the leached-out constituent at a fill volume of 0.5 mL and the concentration at a fill volume of 2 mL is not more than 3, such as not more than 1.5, and the ratio between the concentration at a fill volume of 1 mL and the concentration at a fill volume of 2 mL is not more than 1.8, such as not more than 1.5.

In some embodiments, after a storage time of 48 weeks, the ratio between the concentration of the leached-out constituent at a fill volume of 0.5 mL and the concentration at a fill volume of 2 mL lies not more than 2.5, such as not more than 1.5, and the ratio between the concentration at a fill volume of 1 mL and the concentration at a fill volume of 2 mL lies not more than 1.8, such as not more than 1.5. In some embodiments, the ratio between the concentration at a fill volume of 0.5 mL and the concentration at a fill volume of 2 mL is in the range from 1 to 2.5 and the ratio between the concentration at a fill volume of 1 mL and the concentration at a fill volume of 2 mL is in the range from 1 to 1.8, such as in the range from 1 and 1.5.

Alternatively, the leaching medium used may be a phosphate-buffered solution having a pH of 7 that has been produced on the basis of 10 mmol sodium phosphate, 150 mmol NaCl and Tween 20. In this case, the respective volume of the buffer solution is added to the glass vial and stored at 40° C. for a period of 24 weeks.

In some embodiments, the leaching medium used here is a phosphate-buffered solution having the concentrations shown in Table 3 (measured by ICP analysis prior to contact with the glass vial).

TABLE 3

| ICP concentrations of the phosphate-buffered solution | | | | |
|---|---|---|---|---|
| Blank solution | B [mg/l] | Al [mg/l] | Si [mg/l] | Ca [mg/l] |
| Phosphate buffer | <0.10 | <0.10 | <0.10 | <0.10 |
| Determination limit | 0.10 | 0.10 | 0.10 | 0.10 |

After a storage time of 24 weeks in phosphate-buffered solution, the ratio between the concentration of the leached-out constituent at a fill volume of 0.5 mL and the concentration at a fill volume of 2 mL is not more than 2.5, such as not more than 2, and the ratio between the concentration at a fill volume of 1 mL and the concentration at a fill volume of 2 mL is not more than 1.8, such as not more than 1.6. In some embodiments, after a storage time of 48 weeks, the ratio between the concentration of the leached-out constituent at a fill volume of 0.5 mL and the concentration at a fill volume of 2 mL is not more than 2.5, such as not more than 2, and the ratio between the concentration at a fill volume of 1 mL and the concentration at a fill volume of 2 mL is not more than 1.7, such as not more than 1.5. In some embodiments, the ratio between the concentration at a fill volume of 0.5 mL and the concentration at a fill volume of 2 mL is in the range from 1 to 2.5, such as 2 to 1, and the ratio between the concentration at a fill volume of 1 mL and the concentration at a fill volume of 2 mL is in the range from 1 to 1.7.

Alternatively, the leaching medium used may be an isotonic 0.9% NaCl solution. In this case, the respective volume of the 0.9% NaCl solution is added to the glass vial and stored at 40° C. for a period of 24 weeks. The leaching medium used may be a corresponding NaCl solution having the concentrations according to Table 4.

TABLE 4

| ICP results for NaCl solution | | | | |
|---|---|---|---|---|
| Blank solution | B [mg/l] | Al [mg/l] | Si [mg/l] | Ca [mg/l] |
| 0.9% NaCl | <0.05 | <0.05 | <0.05 | <0.05 |
| Determination limit | 0.05 | 0.05 | 0.05 | 0.05 |

After a storage time of 24 weeks, the ratio between the concentration of the leached-out constituent at a fill volume of 0.5 mL and the concentration at a fill volume of 2 mL is not more than 2.5, such as not more than 2.2, and the ratio between the concentration at a fill volume of 1 mL and the concentration at a fill volume of 2 mL is not more than 1.6, such as not more than 1.5. In some embodiments, after a storage time of 48 weeks, the ratio between the concentration of the leached-out constituent at a fill volume of 0.5 mL and the concentration at a fill volume of 2 mL is not more than 2.5, such as not more than 2.1, and the ratio between the concentration at a fill volume of 1 mL and the concentration at a fill volume of 2 mL is not more than 1.6, such as not more than 1.5. In some embodiments, the ratio between the concentration at a fill volume of 0.5 mL and the concentration at a fill volume of 2 mL is in the range from 1 to 2.5, such as in the range from 1 to 2.2, and the ratio between the concentration at a fill volume of 1 mL and the concentration at a fill volume of 2 mL is in the range from 1 to 1.5.

Alternatively, the leaching medium used may be an 8.4% sodium bicarbonate solution. In this case, the respective volume of the sodium bicarbonate solution is added to the glass vial and stored at 40° C. for a period of 24 weeks. In such embodiments, the leaching medium used may be a sodium bicarbonate solution having the concentrations shown in Table 5.

TABLE 5

ICP concentrations of sodium bicarbonate solution

| Blank solution | B [mg/l] | Al [mg/l] | Si [mg/l] | Ca [mg/l] |
|---|---|---|---|---|
| 8.4% NaHCO$_3$ | <0.10 | <0.10 | 1.4 ± 10% | 4.2 ± 10% |
| Determination limit | 0.10 | 0.10 | 0.50 | 1.25 |

After a storage time of 24 weeks, the ratio between the concentration of the leached-out constituent at a fill volume of 0.5 mL and the concentration at a fill volume of 2 mL is not more than 4.5, such as not more than 1.5, and the ratio between the concentration at a fill volume of 1 mL and the concentration at a fill volume of 2 mL is not more than 2.1, such as not more than 1.4. In some embodiments, the ratio between the concentration at a fill volume of 0.5 mL and the concentration at a fill volume of 2 mL is in the range from 1 to 4.5 or even in the range from 1 and 1.5 and the ratio between the concentration at a fill volume of 1 mL and the concentration at a fill volume of 2 mL is in the range from 1 to 2.1, such as in the range from 1 and 1.4.

In some embodiments, the ratio between the concentration of the leached-out constituent at a fill volume of 0.5 mL and the concentration at a fill volume of 1 mL after a leaching period of 24 weeks with distilled water at 40° C. is not more than 2.5, such as not more than 1.7. More particularly, the ratio between the concentration of the leached-out constituent at a fill volume of 0.5 mL and the concentration at a fill volume of 1 mL is in the range from 1 and 2.5 or even 1 and 1.7.

In some embodiments, the glass vial consists of a multi-component glass comprising at least one of the constituents from the group formed by Si, B, Al, Na, K and/or Ca. In some embodiments, the leached-out glass constituent is at least one of the constituents from the group comprising the elements Si, B, Al, Na, K and Ca.

In some embodiments, on leaching of the glass vial with processed water at a temperature of 40° C. and a storage time of 24 weeks, the ratio between the concentration of the leached-out constituent at a fill volume of 0.5 mL and the concentration of the leached-out constituent at a fill volume of 2 mL is not more than 1.5 for silicon, not more than 2.5 for sodium and/or not more than 3 for boron. In some embodiments, the processed water used as leaching medium has the concentrations listed in Table 1.

More particularly, the ratio between the concentration of the leached-out constituent at a fill volume of 1 mL and the concentration of the leached-out constituent at a fill volume of 2 mL is in the range from 1 to 1.5 for silicon, in the range from 1 to 2.1 for sodium and/or in the range from 1 to 2.5 for boron.

Alternatively or additionally, on leaching of the glass vial with processed water at a temperature of 40° C. and a storage time of 24 weeks, the ratio between the concentration of the leached-out constituent at a fill volume of 0.5 mL and the concentration of the leached-out constituent at a fill volume of 1 mL is not more than 1.5 for silicon, not more than 1.6 for sodium and/or not more than 2 for boron.

In some embodiments, on leaching of the glass vial with processed water at a temperature of 40° C. and a storage time of 24 weeks the concentration of the leached-out constituent at a fill volume of 0.5 mL is not more than 6 mg/l for silicon, not more than 3 mg/l for sodium, not more than 0.6 mg/l for aluminum, not more than 0.2 mg/l for calcium and/or not more than 1.3 mg/l for boron. In some embodiments the processed water used as leaching medium has the concentrations listed in Table 1. In some embodiments, on leaching of the glass vial with processed water at a temperature of 40° C. and a storage time of 24 weeks at a fill volume of 0.5 mL, the concentration of the leached-out constituent is in the range from 3 to 6 mg/l for silicon, in the range from 0.8 to 1.6 mg/l for boron, in the range from 1.6 to 4 mg/l for sodium, in the range from 0.05 to 0.5 mg/l for calcium and/or in the range from 0.1 to 1 mg/l for aluminum.

Alternatively or additionally, after leaching of the glass vial under the abovementioned conditions and a fill volume of 1 mL, the concentration of the leached-out constituent is in the range from 3 to 6 mg/l for silicon, in the range from 0.4 to 1 mg/l for boron, in the range from 1.5 to 2.5 mg/l for sodium, in the range from 0.05 to 0.25 mg/l for calcium and/or in the range from 0.1 to 0.7 mg/l for aluminum.

By virtue of these low concentrations, even in the case of prolonged storage of the pharmaceutical formulation, any influence on efficacy by migrating glass constituents can be avoided.

In some embodiments, on leaching of the glass vial with a 15% KCl solution, especially with a KCl solution according to Table 2, at a temperature of 40° C. and a storage time of 24 weeks with a fill volume of 0.5 mL, the concentration of the leached-out constituent at a fill volume of 0.5 mL is not more than 3 mg/l for silicon, not more than 3.5 mg/l for sodium, not more than 0.6 mg/l for calcium and/or not more than 1.3 mg/l for boron. In some embodiments, the concentration of the leached-out constituent is in the range from 1 to 3 mg/l for silicon, in the range from 0.2 to 1.2 mg/l for boron, in the range from 1.8 to 3.5 mg/l for sodium and/or in the range from 0.2 to 1 mg/l for calcium.

Alternatively or additionally, on leaching of the glass vial with a 15% KCl solution, especially with a KCl solution according to Table 2, at a temperature of 40° C. and a storage time of 24 weeks with a fill volume of 1 mL the concentration of the leached-out constituent is not more than 2 mg/l for silicon, not more than 3 mg/l for sodium, not more than 0.5 mg/l for calcium and/or not more than 1.0 mg/l for boron. In some embodiments, the concentration of the leached-out constituent is in the range from 1 to 2 mg/l for silicon, in the range from 0.2 to 1.0 mg/l for boron, in the range from 1.8 to 3 mg/l for sodium and/or in the range from 0.2 to 0.5 mg/l for calcium.

In some embodiments, on leaching of the glass vial with a 0.9% NaCl solution, especially with an NaCl solution according to Table 3, at a temperature of 40° C. and a storage time of 24 weeks with a fill volume of 0.5 mL the concentration of the leached-out constituent at a fill volume of 0.5 mL is not more than 4 mg/l for silicon, not more than 0.6 mg/l for calcium and/or not more than 1.3 mg/l for boron. In some embodiments, the concentration of the leached-out constituent is in the range from 2 to 4 mg/l for silicon, in the range from 0.6 to 1.5 mg/l for boron, and/or in the range from 0.2 to 1 mg/l for calcium.

Alternatively or additionally, on leaching of the glass vial with 0.9% NaCl solution, especially with an NaCl solution according to Table 3, at a temperature of 40° C. and a storage time of 24 weeks with a fill volume of 1 mL the concentration of the leached-out constituent is not more than 3.5 mg/l for silicon, not more than 0.5 mg/l for calcium and/or not more than 1.5 mg/l for boron. In some embodiments, the concentration of the leached-out constituent is in the range from 2 to 3.5 mg/l for silicon, in the range from 0.2 to 1.3 mg/l for boron, and/or in the range from 0.2 to 0.5 mg/l for calcium.

In some embodiments, on leaching of the glass vial with an 8.4% $NaHCO_3$ solution, especially with an 8.5% $NaHCO_3$ solution according to Table 4, at a temperature of 40° C. and a storage time of 24 weeks with a fill volume of 0.5 mL the concentration of the leached-out constituent at a fill volume of 0.5 mL is not more than 15 mg/l for silicon, not more than 2.8 mg/l for calcium and/or not more than 3 mg/l for boron. In some embodiments, the concentration of the leached-out constituent is in the range from 3 to 15 mg/l for silicon and/or in the range from 0.2 to 3 mg/l for boron.

Alternatively or additionally, on leaching of the glass vial with the abovementioned $NaHCO_3$ solution at a temperature of 40° C. and a storage time of 24 weeks with a fill volume of 1 mL the concentration of the leached-out constituent is not more than 7 mg/l for silicon, not more than 5 mg/l for calcium and/or not more than 1.5 mg/l for boron. In some embodiments, the concentration of the leached-out constituent is in the range from 3 to 10 mg/l for silicon and/or in the range from 0.2 to 1.5 mg/l for boron.

In some embodiments, on leaching of the glass vial with a phosphate-buffered solution having a pH of 7 as leaching medium, especially with a corresponding buffer solution according to Table 5, at a temperature of 40° C. and a storage time of 24 weeks with a fill volume of 0.5 mL the concentration of the leached-out constituent at a fill volume of 0.5 mL is not more than 10 mg/l for silicon, not more than 1 mg/l for calcium and/or not more than 3 mg/l for boron. In some embodiments, the concentration of the leached-out constituent is in the range from 5 to 10 mg/l for silicon and/or in the range from 0.5 to 2.5 mg/l for boron.

Alternatively or additionally, on leaching of the glass vial with the abovementioned $NaHCO_3$ solution at a temperature of 40° C. and a storage time of 24 weeks with a fill volume of 1 mL the concentration of the leached-out constituent is not more than 8 mg/l for silicon, not more than 0.5 mg/l for calcium and/or not more than 2 mg/l for boron. In some embodiments, the concentration of the leached-out constituent is in the range from 8 to 4 mg/l for silicon and/or in the range from 3 to 0.2 mg/l for boron.

By virtue of these low concentrations in different liquids as leaching media, even in the case of prolonged storage of the pharmaceutical formulation, any influence on efficacy by migrating glass constituents can be prevented. By virtue of the low migration load even in near-base regions, the glass vials are especially suitable for use for filling with pharmaceutical formulations with low filling levels. Thus, In some embodiments the filling level is not more than 0.125 or even only not more than 0.1, based on the volume to rim.

The glass vial has a volume to rim of less than 4.5 mL. In some embodiments, the corresponding nominal volume is in the range from 1 to 2 mL. In the case of a glass vial having a nominal volume of 2 mL, the nominal filling level, i.e. the ratio of fill volume to nominal volume, may be not more than 0.5 or even not more than 0.25.

In some exemplary embodiments provided according to the present invention, a glass vial of the present invention is used for filling with a liquid pharmaceutical formulation.

In some embodiments, a glass vial having a total volume of <4.5 mL is made from a boron-containing multicomponent glass. The inner wall of the glass vial has chemical stability against leaching-out of at least one of the constituents of the multicomponent glass, where the concentration of boron ions, measured at a measurement site below the plane of the middle of the vessel using a concentration depth profile at a depth in the range from 10 to 30 nm, has a value, averaged over the measurements of the concentration depth profile, that has an excess increase of not more than 30% compared to a concentration of boron ions measured using a concentration depth profile at a depth in the range from 10 to 30 nm with a measurement site in the plane of the middle of the vessel, where the position of the plane of the middle of the vessel is determined from the underside of the base in the direction of the vial opening, for filling with a liquid pharmaceutical formulation up to a filling level of not more than 0.25.

Referring now to the drawings, FIG. 1 shows a schematic cross section of a glass vial 1 filled with a liquid 4. The glass vial 1 comprises a base 3 and a wall 20, 21 which, in the upper region of the glass vial 1, merges into a neck region 10 and concludes with the rim 11. The wall forms an outer wall 21 and an inner wall 20, and only the inner wall 20 comes into contact with the liquid 4. The plane of the middle of the vial 12 is determined by the underside of the base 13.

The glass vial 1 has a volume to rim of <4.5 mL, the volume to rim being understood to mean the entire internal volume of the glass vial up to the upper edge 11. The actual fill volume 9 is determined by the volume of the liquid 4. According to the present invention, the fill volume 9 is smaller at least by a factor of 4 than the volume to rim 11. The filling level of the glass vial 1 as the quotient between fill volume 9 and volume to rim 11 is therefore less than 0.25.

As a result of the low filling level, the liquid covers predominantly the inner wall of the base 7 and the near-base wall region 6. The inner wall of the base 7 and the near-base wall region are the regions of the glass vial 1 that are most highly affected in terms of their composition owing to the high process temperatures in the forming process to produce the vial. By contrast, wall regions such as, for example, the upper wall region 5 that are at a greater distance from the base 3 are less significantly affected by the production process.

The near-base wall region 6 has a distance in the range from 0.5 to 5 mm and the upper wall region 5 a distance in the range from 10 to 20 mm from the outer base wall.

FIGS. 2 to 31 show the leaching characteristics of a working example and of a comparative example with regard to various glass constituents with different liquids as leaching medium. The corresponding leaching characteristics of the working example are shown here in the diagrams as a solid line and the leaching characteristics of the comparative example as a dotted line.

The comparative example is a glass vial known from the prior art that is used as pharmaceutical packaging media. Both the working example and comparative example have been manufactured with a class I neutral glass. The nominal volume of each of the two glass vials was 2 mL.

To ascertain the leaching characteristics, three different fill volumes, 0.5 mL, 1 mL and 2 mL, were considered with different liquids as leaching medium. The glass vials thus filled were each stored at 40° C. for t1=24 weeks and t2=48 weeks. After these storage times had elapsed, the concentrations of the different glass constituents that had leached out, i.e. been transferred to the liquid from the inner wall 20 of the glass vial, were measured by ICP methods. This involved determining the concentration of the constituents Si, B, Al, Ca and in some cases Na.

After the storage times had elapsed, the glass vials were subjected to various analytical methods. HR-ICP-MS (High Resolution Inductively Coupled Plasma Mass Spectrometry)/ICP-OES (Inductively Coupled Plasma-Optical Emission Spectroscopy) analyses were conducted, combining each fill volume (in double determination) to at least 5 mL of each set and both anchor points. In this way, the concentrations of the glass constituents Si, B, Al, Ca and Na that had been transferred into the dissolution medium were determined quantitatively. The Na concentration was determined only in the case of water and KCl as filling medium.

The working example and the comparative example were filled with the following liquids as leaching medium:
Sample 01: processed water
Sample 02: processed water with steam sterilization
Sample 03: isotonic sodium chloride solution (0.9%)
Sample 04: isotonic sodium chloride solution (0.9%) with steam sterilization
Sample 05: phosphate-containing buffer solution with pH 7
Sample 06: $NaHCO_3$, 8.4%
Sample 07: KCl solution, 15%
Subsequently, the glass vials were sealed with a rubber stopper and an aluminum cap.

In the case of samples 2 and 5, a steam sterilization was additionally conducted at 121° C. for 60 minutes prior to storage of the glass vials. For all samples, there was no regulation of moisture during the storage of the samples at 40° C.

The results of the study are compiled in Tables 6 to 20 which follow.

Table 6 shows the ICP results for the leaching media prior to the filling.

TABLE 6

ICP results for the leaching media prior to the filling

| Blank solution | B [mg/l] | Na [mg/l] | Al [mg/l] | Si [mg/l] | Ca [mg/l] |
|---|---|---|---|---|---|
| Processed water | <0.005 | <0.01 | <0.005 | 0.008 ± 15% | <0.005 |
| Determination limit | 0.005 | 0.01 | 0.005 | 0.005 | 0.005 |
| 0.9% NaCl | <0.05 | — | <0.05 | <0.05 | <0.05 |
| Determination limit | 0.05 | — | 0.05 | 0.05 | 0.05 |
| Phosphate buffer | <0.10 | — | <0.10 | <0.10 | <0.10 |
| Determination limit | 0.10 | — | 0.10 | 0.10 | 0.10 |
| 8.4% $NaHCO_3$ | <0.10 | — | <0.10 | 1.4 ± 10% | 4.2 ± 10% |
| Determination limit | 0.10 | — | 0.10 | 0.50 | 1.25 |
| 15% KCl | <0.20 | 1.3 ± 15% | <0.20 | <0.30 | <0.20 |
| Determination limit | 0.20 | 0.20 | 0.20 | 0.30 | 0.20 |

Table 7 shows the HR-ICP-MS results for processed water after a storage time of 24 weeks.

TABLE 7

HR-ICP-MS results for processed water

| Processed water Samples 01 | B [mg/l] | Na [mg/l] | Al [mg/l] | Si [mg/l] | Ca [mg/l] |
|---|---|---|---|---|---|
| Working example: 0.5 mL_A | 1.1 ± 10% | 2.6 ± 10% | 0.50 ± 10% | 5.2 ± 10% | 0.17 ± 10% |
| Working example: 0.5 mL_B | 1.1 ± 10% | 2.8 ± 10% | 0.52 ± 10% | 5.3 ± 10% | 0.10 ± 25% |
| Working example: 1.0 mL_A | 0.69 ± 10% | 1.9 ± 10% | 0.40 ± 10% | 4.5 ± 10% | 0.11 ± 10% |
| Working example: 1.0 mL_B | 0.72 ± 10% | 2.1 ± 10% | 0.53 ± 10% | 5.0 ± 10% | 0.13 ± 10% |
| Working example: 2.0 mL_A | 0.55 ± 10% | 1.5 ± 10% | 0.53 ± 10% | 4.5 ± 10% | 0.14 ± 10% |
| Working example: 2.0 mL_B | 0.49 ± 10% | 1.3 ± 10% | 0.42 ± 10% | 4.1 ± 10% | 0.12 ± 10% |

TABLE 7-continued

HR-ICP-MS results for processed water

| Processed water Samples 01 | B [mg/l] | Na [mg/l] | Al [mg/l] | Si [mg/l] | Ca [mg/l] |
|---|---|---|---|---|---|
| Comparative example: 0.5 mL_A | 4.8 ± 10% | 9.8 ± 10% | 0.64 ± 10% | 16 ± 10% | 0.96 ± 10% |
| Comparative example: 0.5 mL_B | 3.3 ± 10% | 7.0 ± 10% | 0.82 ± 10% | 13 ± 10% | 0.57 ± 10% |
| Comparative example: 1.0 mL_A | 1.4 ± 10% | 3.2 ± 10% | 0.86 ± 10% | 7.8 ± 10% | 0.30 ± 10% |
| Comparative example: 1.0 mL_B | 1.2 ± 10% | 2.8 ± 10% | 0.77 ± 10% | 7.1 ± 10% | 0.27 ± 10% |
| Comparative example: 2.0 mL_A | 0.70 ± 10% | 1.7 ± 10% | 0.67 ± 10% | 5.2 ± 10% | 0.19 ± 25% |
| Comparative example: 2.0 mL_B | 0.65 ± 10% | 1.4 ± 10% | 0.63 ± 10% | 4.7 ± 10% | 0.18 ± 25% |
| Determination limit | 0.05 | 0.10 | 0.05 | 0.05 | 0.05 |

Table 8 shows the HR-ICP-MS results for samples filled with water and sterilized with steam after a storage time of 24 weeks.

TABLE 8

HR-ICP-MS results for samples filled with processed water and sterilized with steam

| Processed water Samples 02 | B [mg/l] | Na [mg/l] | Al [mg/l] | Si [mg/l] | Ca [mg/l] |
|---|---|---|---|---|---|
| Working example: 0.5 mL_A | 1.6 ± 10% | 4.0 ± 10% | 0.66 ± 10% | 8.3 ± 10% | 0.20 ± 10% |
| Working example: 0.5 mL_B | 1.5 ± 10% | 3.8 ± 10% | 0.67 ± 10% | 8.2 ± 10% | 0.18 ± 25% |
| Working example: 1.0 mL_A | 0.94 ± 10% | 2.6 ± 10% | 0.60 ± 10% | 6.5 ± 10% | 0.16 ± 10% |
| Working example: 1.0 mL_B | 0.93 ± 10% | 2.4 ± 10% | 0.51 ± 10% | 5.9 ± 10% | 0.12 ± 10% |
| Working example: 2.0 mL_A | 0.57 ± 10% | 1.8 ± 10% | 0.57 ± 10% | 5.0 ± 10% | 0.14 ± 10% |
| Working example: 2.0 mL_B | 0.65 ± 10% | 1.8 ± 10% | 0.60 ± 10% | 5.3 ± 10% | 0.15 ± 10% |
| Comparative example: 0.5 mL_A | 5.2 ± 10% | 9.9 ± 10% | 1.0 ± 10% | 20 ± 10% | 0.89 ± 10% |
| Comparative example: 0.5 mL_B | 4.8 ± 10% | 9.5 ± 10% | 0.97 ± 10% | 19 ± 10% | 0.96 ± 10% |
| Comparative example: 1.0 mL_A | 1.9 ± 10% | 3.9 ± 10% | 0.81 ± 10% | 11 ± 10% | 0.24 ± 10% |
| Comparative example: 1.0 mL_B | 1.8 ± 10% | 3.7 ± 10% | 0.74 ± 10% | 10 ± 10% | 0.24 ± 10% |
| Comparative example: 2.0 mL_A | 1.0 ± 10% | 2.3 ± 10% | 0.65 ± 10% | 7.1 ± 10% | 0.21 ± 10% |
| Comparative example: 2.0 mL_B | 1.0 ± 10% | 2.3 ± 10% | 0.64 ± 10% | 6.9 ± 10% | 0.21 ± 10% |
| Determination limit | 0.05 | 0.10 | 0.05 | 0.05 | 0.05 |

Table 9 shows the HR-ICP-MS results for samples filled with 0.9% NaCl after a storage time of 24 weeks, calculating the relative measurement errors with k=2.

TABLE 9

HR-ICP-MS results for samples filled with 0.9% NaCl

| 0.9% NaCl Samples 03 | B [mg/l] | Al [mg/l] | Si [mg/l] | Ca [mg/l] |
|---|---|---|---|---|
| Working example: 0.5 mL_A | 1.2 ± 10% | 0.76 ± 10% | 3.0 ± 10% | 0.46 ± 10% |
| Working example: 0.5 mL_B | 1.1 ± 10% | 0.11 ± 10% | 3.2 ± 10% | 0.46 ± 10% |
| Working example: 1.0 mL_A | 0.67 ± 10% | 0.13 ± 10% | 2.5 ± 10% | 0.29 ± 10% |
| Working example: 1.0 mL B | 0.67 ± 10% | 0.14 ± 10% | 2.8 ± 10% | 0.29 ± 10% |
| Working example: 2.0 mL A | 0.49 ± 10% | 0.16 ± 10% | 2.4 ± 10% | 0.23 ± 10% |
| Working example: 2.0 mL_B | 0.50 ± 10% | 0.17 ± 10% | 2.5 ± 10% | 0.21 ± 10% |
| Comparative example: 0.5 mL_A | 8.4 ± 10% | <0.10 | 25 ± 10% | 3.9 ± 10% |
| Comparative example: 0.5 mL_B | 8.3 ± 10% | <0.10 | 24 ± 10% | 2.6 ± 10% |
| Comparative example: 1.0 mL_A | 2.8 ± 10% | <0.10 | 9.7 ± 10% | 0.89 ± 10% |
| Comparative example: 1.0 mL_B | 2.8 ± 10% | <0.10 | 9.3 ± 10% | 0.87 ± 10% |
| Comparative example: 2.0 mL_A | 1.2 ± 10% | <0.10 | 4.9 ± 10% | 0.41 ± 10% |
| Comparative example: 2.0 mL_B | 1.1 ± 10% | <0.10 | 4.5 ± 10% | 0.39 ± 10% |
| Determination limit | 0.10 | 0.10 | 0.10 | 0.10 |

Table 10 shows the HR-ICP-MS results for samples filled with 0.9% NaCl and sterilized with steam after a storage time of 24 weeks.

TABLE 10

HR-ICP-MS results for steam-sterilized samples filled with 0.9% NaCl

| 0.9% NaCl Samples 04 | B [mg/l] | Al [mg/l] | Si [mg/l] | Ca [mg/l] |
|---|---|---|---|---|
| Working example: 0.5 mL_A | 1.2 ± 10% | <0.10 | 4.7 ± 10% | 0.69 ± 10% |
| Working example: 0.5 mL_B | 1.2 ± 10% | <0.10 | 4.6 ± 10% | 0.62 ± 10% |
| Working example: 1.0 mL_A | 0.58 ± 10% | <0.10 | 3.1 ± 10% | 0.34 ± 10% |
| Working example: 1.0 mL_B | 0.62 ± 10% | <0.10 | 3.2 ± 10% | 0.34 ± 10% |
| Working example: 2.0 mL_A | 0.34 ± 10% | <0.10 | 2.4 ± 10% | 0.22 ± 25% |
| Working example: 2.0 mL_B | 0.34 ± 10% | <0.10 | 2.3 ± 10% | 0.20 ± 25% |
| Comparative example: 0.5 mL A | 4.0 ± 10% | 0.16 ± 10% | 14 ± 10% | 1.7 ± 10% |
| Comparative example: 0.5 mL_B | 4.3 ± 10% | 0.29 ± 10% | 15 ± 10% | 2.9 ± 10% |
| Comparative example: 1.0 mL A | 2.3 ± 10% | 0.16 ± 10% | 9.3 ± 10% | 0.82 ± 10% |
| Comparative example: 1.0 mL B | 2.3 ± 10% | 0.14 ± 10% | 9.2 ± 10% | 0.80 ± 10% |
| Comparative example: 2.0 mL A | 1.4 ± 10% | 0.16 ± 10% | 6.6 ± 10% | 0.50 ± 10% |
| Comparative example: 2.0 mL B | 1.4 ± 10% | 0.14 ± 10% | 6.4 ± 10% | 0.52 ± 10% |
| Determination limit | 0.10 | 0.10 | 0.10 | 0.10 |

Table 11 shows the HR-ICP-MS results for samples filled with a phosphate buffer solution after a storage time of 24 weeks.

TABLE 11

HR-ICP-MS results for samples filled with a phosphate buffer solution

| Phosphate buffer solution Samples 05 | B [mg/l] | Al [mg/l] | Si [mg/l] | Ca [mg/l] |
|---|---|---|---|---|
| Working example: 0.5 mL_A | 1.5 ± 10% | <0.20 | 7.8 ± 10% | 0.61 ± 10% |
| Working example: 0.5 mL_B | 1.6 ± 10% | <0.20 | 7.9 ± 10% | 0.63 ± 10% |
| Working example: 1.0 mL A | 1.0 ± 10% | <0.20 | 6.4 ± 10% | 0.42 ± 10% |
| Working example: 1.0 mL_B | 1.1 ± 10% | <0.20 | 6.7 ± 10% | 0.43 ± 10% |
| Working example: 2.0 mL_A | 0.66 ± 10% | <0.20 | 5.1 ± 10% | 0.30 ± 25% |
| Working example: 2.0 mL_B | 0.68 ± 10% | <0.20 | 5.2 ± 10% | 0.27 ± 25% |
| Comparative example: 0.5 mL_A | 6.5 ± 10% | <0.20 | 21 ± 10% | 2.5 ± 10% |
| Comparative example: 0.5 mL_B | 6.6 ± 10% | <0.20 | 21 ± 10% | 2.4 ± 10% |
| Comparative example: 1.0 mL A | 3.2 ± 10% | <0.20 | 15 ± 10% | 0.97 ± 10% |
| Comparative example: 1.0 mL B | 3.0 ± 10% | <0.20 | 14 ± 10% | 0.84 ± 10% |
| Comparative example: 2.0 mL_A | 1.6 ± 10% | <0.20 | 9.5 ± 10% | 0.53 ± 10% |
| Comparative example: 2.0 mL_B | 1.6 ± 10% | <0.20 | 9.6 ± 10% | 0.51 ± 10% |
| Determination limit | 0.20 | 0.20 | 0.20 | 0.20 |

Table 12 shows the HR-ICP-MS results for samples filled with 8.4% NaHCO₃ after a storage time of 24 weeks.

TABLE 12

| HR-ICP-MS results for samples filled with 8.4% NaHCO$_3$ | | | | |
|---|---|---|---|---|
| 8.4% NaHCO$_3$ Samples 06 | B [mg/l] | Al [mg/l] | Si [mg/l] | Ca [mg/l] |
| Working example: 0.5 mL_A | 2.1 ± 10% | <0.20 | 10 ± 10% | 2.5 ± 10% |
| Working example: 0.5 mL_B | 2.0 ± 10% | <0.20 | 10 ± 10% | 2.2 ± 10% |
| Working example: 1.0 mL_A | 0.94 ± 10% | <0.20 | 5.7 ± 10% | 4.6 ± 10% |
| Working example: 1.0 mL_B | 0.93 ± 10% | <0.20 | 5.7 ± 10% | 4.1 ± 10% |
| Working example: 2.0 mL_A | 0.47 ± 10% | 0.20 ± 10% | 4.2 ± 10% | 5.0 ± 10% |
| Working example: 2.0 mL_B | 0.49 ± 10% | 0.20 ± 10% | 4.3 ± 10% | 5.0 ± 10% |
| Comparative example: 0.5 mL_A | 9.4 ± 10% | <0.20 | 37 ± 10% | 1.9 ± 10% |
| Comparative example: 0.5 mL_B | 8.9 ± 10% | <0.20 | 36 ± 10% | 1.8 ± 10% |
| Comparative example: 1.0 mL_A | 4.3 ± 10% | <0.20 | 19 ± 10% | 5.9 ± 10% |
| Comparative example: 1.0 mL_B | 4.4 ± 10% | <0.20 | 20 ± 10% | 5.6 ± 10% |
| Comparative example: 2.0 mL_A | 2.0 ± 10% | <0.20 | 10 ± 10% | 5.4 ± 10% |
| Comparative example: 2.0 mL_B | 2.0 ± 10% | <0.20 | 10 ± 10% | 5.4 ± 10% |
| Determination limit | 0.20 | 0.20 | 0.50 | 1.25 |

Table 13 shows the ICP-OES results for samples filled with 15% KCl after a storage time of 24 weeks.

TABLE 13

| ICP-OES results for samples filled with 15% KCl | | | | | |
|---|---|---|---|---|---|
| 15% KCl Samples 07 | B [mg/l] | Na [mg/l] | Al [mg/l] | Si [mg/l] | Ca [mg/l] |
| Working example: 0.5 mL_A | 0.91 ± 15% | 2.9 ± 15% | <0.20 | 1.4 ± 15% | 0.45 ± 30% |
| Working example: 0.5 mL_B | 0.92 ± 15% | 2.7 ± 15% | <0.20 | 1.3 ± 15% | 0.44 ± 30% |
| Working example: 1.0 mL_A | 0.65 ± 15% | 2.3 ± 15% | <0.20 | 1.3 ± 15% | 0.37 ± 30% |
| Working example: 1.0 mL_B | 0.59 ± 15% | 2.2 ± 15% | <0.20 | 1.2 ± 15% | 0.36 ± 30% |
| Working example: 2.0 mL_A | 0.35 ± 30% | 1.9 ± 15% | <0.20 | 1.1 ± 15% | 0.21 ± 30% |
| Working example: 2.0 mL_B | 0.33 ± 30% | 2.1 ± 15% | <0.20 | 1.1 ± 15% | 0.21 ± 30% |
| Comparative example: 0.5 mL_A | 8.0 ± 10% | 15 ± 10% | <0.20 | 23 ± 10% | 2.7 ± 15% |
| Comparative example: 0.5 mL_B | 8.4 ± 10% | 15 ± 10% | <0.20 | 24 ± 10% | 2.8 ± 15% |
| Comparative example: 1.0 mL_A | 4.5 ± 15% | 8.3 ± 10% | <0.20 | 15 ± 10% | 1.5 ± 15% |
| Comparative example: 1.0 mL_B | 4.6 ± 15% | 8.7 ± 10% | <0.20 | 16 ± 10% | 1.4 ± 15% |
| Comparative example: 2.0 mL_A | 2.2 ± 15% | 4.8 ± 15% | <0.20 | 8.5 ± 10% | 0.74 ± 15% |
| Comparative example: 2.0 mL_B | 1.9 ± 15% | 4.3 ± 15% | <0.20 | 7.5 ± 10% | 0.66 ± 15% |
| Determination limit | 0.20 | 0.20 | 0.20 | 0.30 | 0.20 |

Table 14 shows the HR-ICP-MS results for processed water after a storage time of 48 weeks.

TABLE 14

| HR-ICP-MS results for samples filled with processed water | | | | | |
|---|---|---|---|---|---|
| Processed water Samples 11 | B [mg/l] | Na [mg/l] | Al [mg/l] | Si [mg/l] | Ca [mg/l] |
| Working example: 0.5 mL_A | 1.4 ± 10% | 3.3 ± 10% | 0.77 ± 10% | 8.2 ± 10% | 0.12 ± 25% |
| Working example: 0.5 mL_B | 1.4 ± 10% | 3.6 ± 10% | 0.83 ± 10% | 9.3 ± 10% | 0.16 ± 25% |
| Working example: 1.0 mL_A | 0.94 ± 10% | 2.4 ± 10% | 0.68 ± 10% | 6.6 ± 10% | 0.11 ± 25% |
| Working example: 1.0 mL_B | 0.85 ± 10% | 2.2 ± 10% | 0.57 ± 10% | 6.0 ± 10% | 0.13 ± 25% |
| Working example: 2.0 mL_A | 0.61 ± 10% | 1.6 ± 10% | 0.64 ± 10% | 5.5 ± 10% | 0.16 ± 25% |
| Working example: 2.0 mL_B | 0.65 ± 10% | 1.7 ± 10% | 0.72 ± 10% | 5.9 ± 10% | 0.16 ± 25% |
| Comparative example: 0.5 mL_A | 4.8 ± 10% | 8.7 ± 10% | 0.85 ± 10% | 17 ± 10% | 0.21 ± 25% |
| Comparative example: 0.5 mL_B | 5.1 ± 10% | 9.3 ± 10% | 0.71 ± 10% | 19 ± 10% | 0.24 ± 25% |
| Comparative example: 1.0 mL_A | 1.5 ± 10% | 3.3 ± 10% | 0.78 ± 10% | 9.3 ± 10% | 0.18 ± 25% |
| Comparative example: 1.0 mL_B | 1.4 ± 10% | 3.3 ± 10% | 0.67 ± 10% | 9.1 ± 10% | 0.14 ± 25% |
| Comparative example: 2.0 mL_A | 0.82 ± 10% | 2.0 ± 10% | 0.46 ± 10% | 6.0 ± 10% | 0.15 ± 25% |
| Comparative example: 2.0 mL_B | 0.78 ± 10% | 1.9 ± 10% | 0.41 ± 10% | 5.8 ± 10% | 0.14 ± 25% |
| Determination limit | 0.05 | 0.10 | 0.05 | 0.05 | 0.05 |

Table 15 shows the HR-ICP-MS results for samples filled with water and sterilized with steam after a storage time of 48 weeks.

TABLE 15

HR-ICP-MS results for samples filled with processed water and sterilized with steam

| Processed water<br>Samples 12 | B<br>[mg/l] | Na<br>[mg/l] | Al<br>[mg/l] | Si<br>[mg/l] | Ca<br>[mg/l] |
|---|---|---|---|---|---|
| Working example: 0.5 mL_A | 1.4 ± 10% | 3.8 ± 10% | 0.71 ± 10% | 10 ± 10% | 0.13 ± 25% |
| Working example: 0.5 mL_B | 1.5 ± 10% | 3.6 ± 10% | 0.61 ± 10% | 9.4 ± 10% | 0.13 ± 25% |
| Working example: 1.0 mL_A | 1.0 ± 10% | 2.5 ± 10% | 0.57 ± 10% | 7.3 ± 10% | 0.13 ± 25% |
| Working example: 1.0 mL_B | 1.1 ± 10% | 2.6 ± 10% | 0.52 ± 10% | 7.2 ± 10% | 0.12 ± 25% |
| Working example: 2.0 mL_A | 0.68 ± 10% | 1.8 ± 10% | 0.58 ± 10% | 5.9 ± 10% | 0.15 ± 25% |
| Working example: 2.0 mL_B | 0.69 ± 10% | 1.8 ± 10% | 0.63 ± 10% | 6.1 ± 10% | 0.14 ± 25% |
| Comparative example: 0.5 mL_A | 5.5 ± 10% | 10 ± 10% | 0.67 ± 10% | 21 ± 10% | 1.1 ± 10% |
| Comparative example: 0.5 mL_B | 5.4 ± 10% | 10 ± 10% | 0.80 ± 10% | 21 ± 10% | 0.89 ± 10% |
| Comparative example: 1.0 mL_A | 2.2 ± 10% | 4.4 ± 10% | 0.72 ± 10% | 13 ± 10% | 0.15 ± 25% |
| Comparative example: 1.0 mL_B | 2.4 ± 10% | 4.6 ± 10% | 0.83 ± 10% | 12 ± 10% | 0.12 ± 25% |
| Comparative example: 2.0 mL_A | 1.0 ± 10% | 2.4 ± 10% | 0.52 ± 10% | 8.3 ± 10% | 0.16 ± 25% |
| Comparative example: 2.0 mL_B | 1.0 ± 10% | 2.3 ± 10% | 0.46 ± 10% | 7.9 ± 10% | 0.15 ± 25% |
| Determination limit | 0.05 | 0.10 | 0.05 | 0.05 | 0.05 |

Table 16 shows the HR-ICP-MS results for samples filled with 0.9% NaCl after a storage time of 48 weeks.

TABLE 16

HR-ICP-MS results for samples filled with 0.9% NaCl

| 0.9% NaCl<br>Samples 13 | B<br>[mg/l] | Al<br>[mg/l] | Si<br>[mg/l] | Ca<br>[mg/l] |
|---|---|---|---|---|
| Working example: 0.5 mL_A | 1.3 ± 10% | 0.10 ± 10% | 4.3 ± 10% | 0.48 ± 10% |
| Working example: 0.5 mL_B | 1.2 ± 10% | 0.10 ± 10% | 4.2 ± 10% | 0.47 ± 10% |
| Working example: 1.0 mL_A | 0.65 ± 10% | 0.14 ± 10% | 3.3 ± 10% | 0.30 ± 10% |
| Working example: 1.0 mL B | 0.64 ± 10% | 0.14 ± 10% | 3.3 ± 10% | 0.32 ± 10% |
| Working example: 2.0 mL_A | 0.30 ± 10% | 0.19 ± 10% | 2.6 ± 10% | 0.18 ± 10% |
| Working example: 2.0 mL_B | 0.32 ± 10% | 0.21 ± 10% | 2.8 ± 10% | 0.17 ± 10% |
| Comparative example: 0.5 mL_A | 11 ± 10% | <0.10 | 33 ± 10% | 4.3 ± 10% |
| Comparative example: 0.5 mL_B | 11 ± 10% | <0.10 | 33 ± 10% | 4.2 ± 10% |
| Comparative example: 1.0 mL_A | 2.7 ± 10% | <0.10 | 11 ± 10% | 0.96 ± 10% |
| Comparative example: 1.0 mL_B | 3.4 ± 10% | <0.10 | 14 ± 10% | 1.1 ± 10% |
| Comparative example: 2.0 mL_A | 1.4 ± 10% | 0.13 ± 10% | 6.7 ± 10% | 0.52 ± 10% |
| Comparative example: 2.0 mL_B | 1.4 ± 10% | 0.14 ± 10% | 6.2 ± 10% | 0.50 ± 10% |
| Determination limit | 0.10 | 0.10 | 0.10 | 0.10 |

Table 17 shows the HR-ICP-MS results for samples filled with 0.9% NaCl and sterilized with steam after a storage time of 48 weeks, calculating the relative measurement errors with k=2.

TABLE 17

HR-ICP-MS results for steam-sterilized samples filled with 0.9% NaCl

| 0.9% NaCl<br>Samples 14 | B<br>[mg/l] | Al<br>[mg/l] | Si<br>[mg/l] | Ca<br>[mg/l] |
|---|---|---|---|---|
| Working example: 0.5 mL_A | 1.5 ± 10% | 0.10 ± 10% | 6.9 ± 10% | 0.81 ± 10% |
| Working example: 0.5 mL_B | 1.5 ± 10% | 0.11 ± 10% | 6.6 ± 10% | 0.79 ± 10% |
| Working example: 1.0 mL A | 0.72 ± 10% | 0.11 ± 10% | 4.2 ± 10% | 0.40 ± 10% |
| Working example: 1.0 mL B | 0.73 ± 10% | 0.10 ± 10% | 4.0 ± 10% | 0.43 ± 10% |
| Working example: 2.0 mL A | 0.37 ± 10% | 0.17 ± 10% | 3.3 ± 10% | 0.21 ± 10% |
| Working example: 2.0 mL B | 0.34 ± 10% | 0.17 ± 10% | 3.2 ± 10% | 0.20 ± 10% |
| Comparative example: 0.5 mL_A | 4.9 ± 10% | 0.23 ± 10% | 17 ± 10% | 2.3 ± 10% |
| Comparative example: 0.5 mL_B | 5.1 ± 10% | 0.21 ± 10% | 17 ± 10% | 2.3 ± 10% |
| Comparative example: 1.0 mL A | 3.0 ± 10% | <0.10 | 12 ± 10% | 1.0 ± 10% |
| Comparative example: 1.0 mL_B | 2.9 ± 10% | 0.12 ± 10% | 12 ± 10% | 0.97 ± 10% |
| Comparative example: 2.0 mL_A | 1.9 ± 10% | 0.12 ± 10% | 8.8 ± 10% | 0.64 ± 10% |
| Comparative example: 2.0 mL_B | 1.8 ± 10% | 0.16 ± 10% | 8.8 ± 10% | 0.62 ± 10% |
| Determination limit | 0.10 | 0.10 | 0.10 | 0.10 |

Table 18 shows the HR-ICP-MS results for samples filled with a phosphate buffer solution after a storage time of 48 weeks.

TABLE 18

| Phosphate buffer solution Samples 15 | B [mg/l] | Al [mg/l] | Si [mg/l] | Ca [mg/l] |
|---|---|---|---|---|
| Working example: 0.5 mL_A | 1.8 ± 10% | <0.20 | 12 ± 10% | 0.67 ± 10% |
| Working example: 0.5 mL_B | 1.7 ± 10% | <0.20 | 12 ± 10% | 0.69 ± 10% |
| Working example: 1.0 mL_A | 1.2 ± 10% | <0.20 | 11 ± 10% | 0.48 ± 10% |
| Working example: 1.0 mL_B | 1.1 ± 10% | <0.20 | 10 ± 10% | 0.46 ± 10% |
| Working example: 2.0 mL_A | 0.82 ± 10% | <0.20 | 8.5 ± 10% | 0.73 ± 10% |
| Working example: 2.0 mL_B | 0.79 ± 10% | <0.20 | 8.6 ± 10% | 0.34 ± 25% |
| Comparative example: 0.5 mL_A | 6.4 ± 10% | <0.20 | 27 ± 10% | 2.3 ± 10% |
| Comparative example: 0.5 mL_B | 6.0 ± 10% | <0.20 | 26 ± 10% | 2.6 ± 10% |
| Comparative example: 1.0 mL_A | 2.9 ± 10% | <0.20 | 19 ± 10% | 0.92 ± 10% |
| Comparative example: 1.0 mL_B | 3.0 ± 10% | <0.20 | 18 ± 10% | 0.92 ± 10% |
| Comparative example: 2.0 mL_A | 1.6 ± 10% | <0.20 | 13 ± 10% | 0.52 ± 10% |
| Comparative example: 2.0 mL_B | 1.6 ± 10% | <0.20 | 13 ± 10% | 0.53 ± 10% |
| Determination limit | 0.20 | 0.20 | 0.20 | 0.20 |

Table 19 shows the HR-ICP-MS results for samples filled with 8.4% $NaHCO_3$ after a storage time of 48 weeks, calculating the relative measurement errors with k=2.

TABLE 19

| 8.4% $NaHCO_3$ Samples 16 | B [mg/l] | Al [mg/l] | Si [mg/l] | Ca [mg/l] |
|---|---|---|---|---|
| Working example: 0.5 mL_A | 3.2 ± 10% | <0.20 | 20 ± 10% | 2.2 ± 10% |
| Working example: 0.5 mL_B | 3.5 ± 10% | <0.20 | 20 ± 10% | 2.2 ± 10% |
| Working example: 1.0 mL_A | 1.3 ± 10% | <0.20 | 9.0 ± 10% | 2.4 ± 10% |
| Working example: 1.0 mL_B | 1.3 ± 10% | <0.20 | 8.9 ± 10% | 3.0 ± 10% |
| Working example: 2.0 mL_A | 0.67 ± 10% | <0.20 | 5.7 ± 10% | 5.0 ± 10% |
| Working example: 2.0 mL_B | 0.69 ± 10% | <0.20 | 5.9 ± 10% | 5.3 ± 10% |
| Comparative example: 0.5 mL_A | 11 ± 10% | <0.20 | 51 ± 10% | 2.1 ± 10% |
| Comparative example: 0.5 mL_B | 13 ± 10% | <0.20 | 52 ± 10% | 2.0 ± 10% |
| Comparative example: 1.0 mL_A | 5.5 ± 10% | <0.20 | 32 ± 10% | 2.1 ± 10% |
| Comparative example: 1.0 mL_B | 5.8 ± 10% | <0.20 | 30 ± 10% | 2.0 ± 10% |
| Comparative example: 2.0 mL_A | 2.5 ± 10% | <0.20 | 15 ± 10% | 5.5 ± 10% |
| Comparative example: 2.0 mL_B | 2.2 ± 10% | <0.20 | 15 ± 10% | 5.6 ± 10% |
| Determination limit | 0.20 | 0.20 | 0.50 | 1.25 |

Table 20 shows the ICP-OES results for samples filled with 15% KCl after a storage time of 48 weeks, calculating the relative measurement errors with k=2.

TABLE 20

| 15% KCl Samples 17 | B [mg/l] | Na [mg/l] | Al [mg/l] | Si [mg/l] | Ca [mg/l] |
|---|---|---|---|---|---|
| Working example: 0.5 mL_A | 1.1 ± 15% | 3.6 ± 15% | <0.20 | 1.8 ± 15% | 0.48 ± 30% |
| Working example: 0.5 mL_B | 1.1 ± 15% | 3.3 ± 15% | <0.20 | 1.7 ± 15% | 0.47 ± 30% |
| Working example: 1.0 mL_A | 0.66 ± 15% | 2.4 ± 15% | <0.20 | 1.3 ± 15% | 0.33 ± 30% |
| Working example: 1.0 mL_B | 0.66 ± 15% | 2.4 ± 15% | <0.20 | 1.3 ± 15% | 0.32 ± 30% |
| Working example: 2.0 mL_A | 0.42 ± 30% | 1.9 ± 15% | <0.20 | 1.2 ± 15% | <0.20 |
| Working example: 2.0 mL_B | 0.42 ± 30% | 1.9 ± 15% | <0.20 | 1.2 ± 15% | <0.20 |
| Comparative example: 0.5 mL_A | 7.6 ± 10% | 15 ± 10% | <0.20 | 23 ± 10% | 2.4 ± 15% |
| Comparative example: 0.5 mL_B | 7.7 ± 10% | 15 ± 10% | <0.20 | 24 ± 10% | 2.5 ± 15% |
| Comparative example: 1.0 mL_A | 4.3 ± 15% | 8.6 ± 10% | <0.20 | 16 ± 10% | 1.5 ± 15% |
| Comparative example: 1.0 mL_B | 4.4 ± 15% | 8.7 ± 10% | <0.20 | 16 ± 10% | 1.4 ± 15% |
| Comparative example: 2.0 mL_A | 2.5 ± 15% | 5.2 ± 10% | <0.20 | 10 ± 10% | 0.75 ± 15% |
| Comparative example: 2.0 mL_B | 2.6 ± 15% | 5.3 ± 10% | <0.20 | 11 ± 10% | 0.76 ± 15% |
| Determination limit | 0.20 | 0.20 | 0.20 | 0.30 | 0.20 |

FIGS. 2 to 5 show the leaching characteristics of working example and comparative example for boron with different leaching media. In the corresponding diagrams, the quotient of the concentrations at the respective fill volume (0.5 mL, 1 mL and 2 mL) and at the concentration at a fill volume of 2 mL is plotted here. At a fill volume of 0.5 mL, essentially the base of the glass vial and the near-base wall regions are wetted with the liquid and hence contribute to the migration load. By contrast, the lower migration load of wall regions at a greater distance from the base is not included. Thus, the concentrations at a fill volume of 0.5 mL represent the leaching characteristics of the base and the near-base wall regions and hence the migration load at very low filling levels.

At a fill volume of 1 mL, wall regions with a lower migration load are also covered, and so these are included in the total migration load. A fill volume of 2 mL in working example and comparative example corresponds to the nominal volume. Thus, the majority of the liquid covers the unformed wall regions of the glass vial. Correspondingly, the effect of the high migration load by near-base regions is very low to negligible.

The concentration ratios of the leached-out constituents at a fill volume of 0.5 mL and 2 mL or at a fill volume of 1 mL and 2 mL are a measure of the difference in leaching intensity experienced by a liquid at very low or low filling levels from the leaching intensity at a high filling level. A ratio of 1.6 would mean that there is no difference in the leaching intensity at the corresponding filling level to the leaching intensity at a filling level corresponding to the nominal volume of the glass vial.

The ratio of the concentrations at fill volume 1 mL and fill volume 2 mL permits conclusions as to the height at which, i.e. as to the distance from the base of the glass vial at which, the inner wall of the glass vial has elevated leaching intensity as a result of the production process.

It becomes clear from FIGS. 2 to 5 that the migration load that emanates from the near-base wall region through release of boron ions from the in the working example (solid line) is much lower than in the comparative example (dotted line). This is applicable here to all four leaching media. For example, the concentration ratio of fill volume 0.5 mL to fill volume 2 mL in the case of NaCl solution as leaching medium (FIG. 4) is more than three times lower in the working example than in the comparative example, meaning that the leaching intensity of the near-base wall regions is significantly lower in the working example than the comparative example. Furthermore, for all leaching media, the concentration ratio between 1 mL and 2 mL is significantly lower in the working example than in the comparative example.

Figure 8:
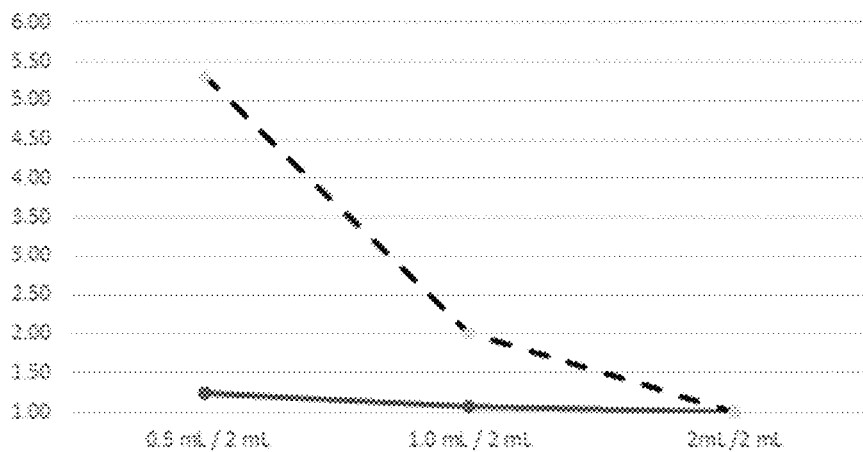
Figure 9:
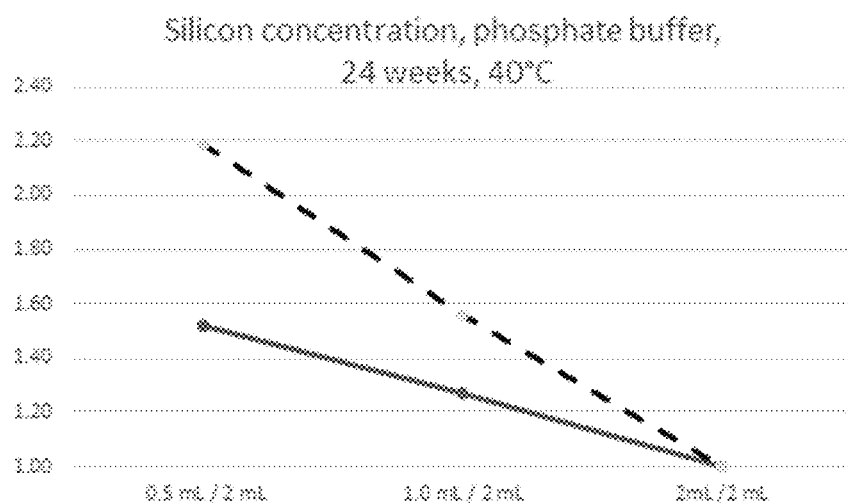
Figure 10:
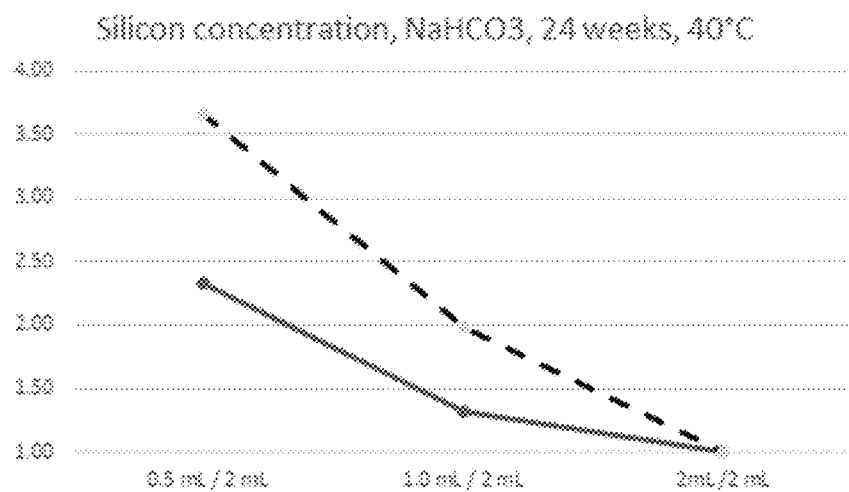
Figure 11:
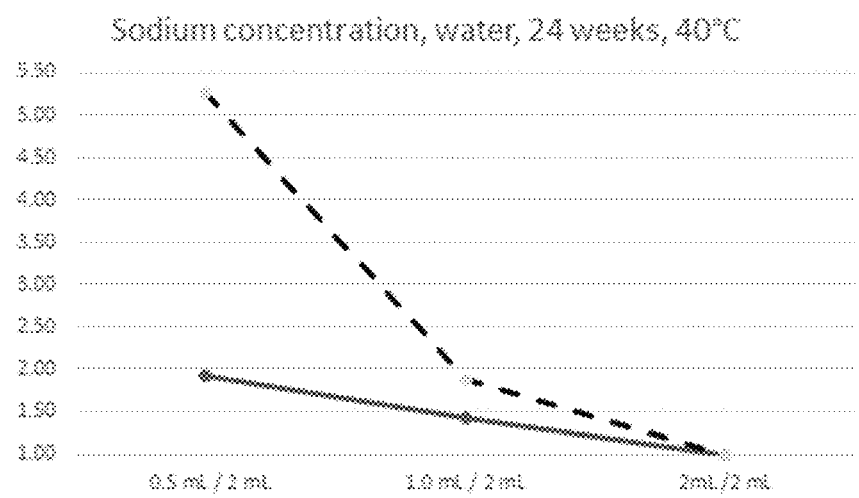
FIG. 11 to FIG. 12 illustrate leaching characteristics with regard to sodium with different liquids as leaching medium.
Figure 12:
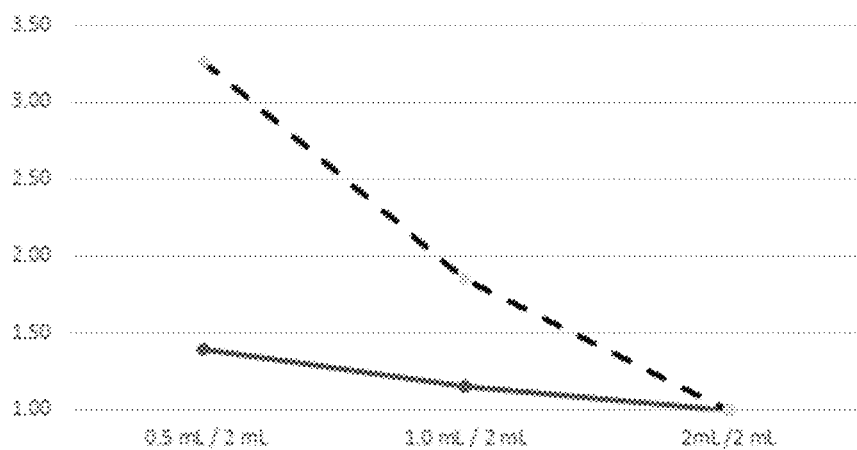
Figure 13:
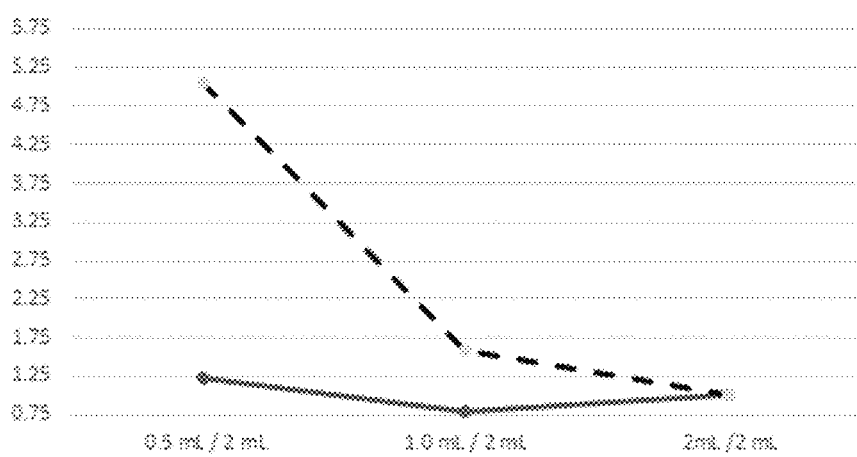
FIG. 13 to FIG. 16 illustrate leaching characteristics with regard to calcium with different liquids as leaching medium.
Figure 14:
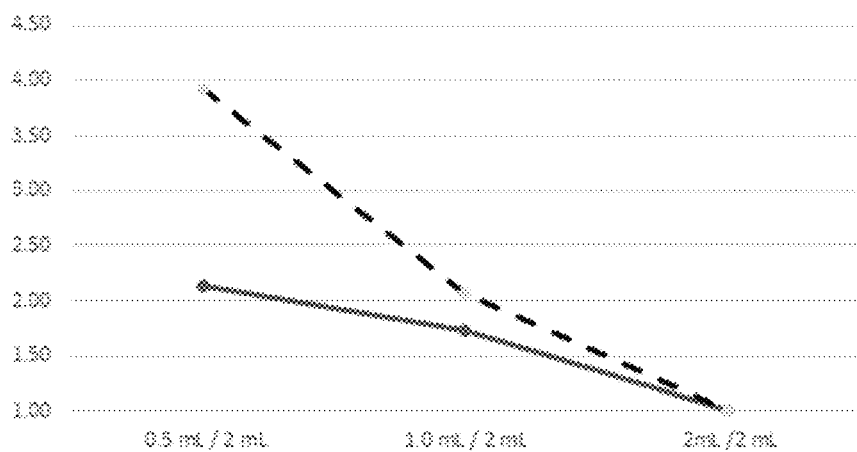
Figure 15:
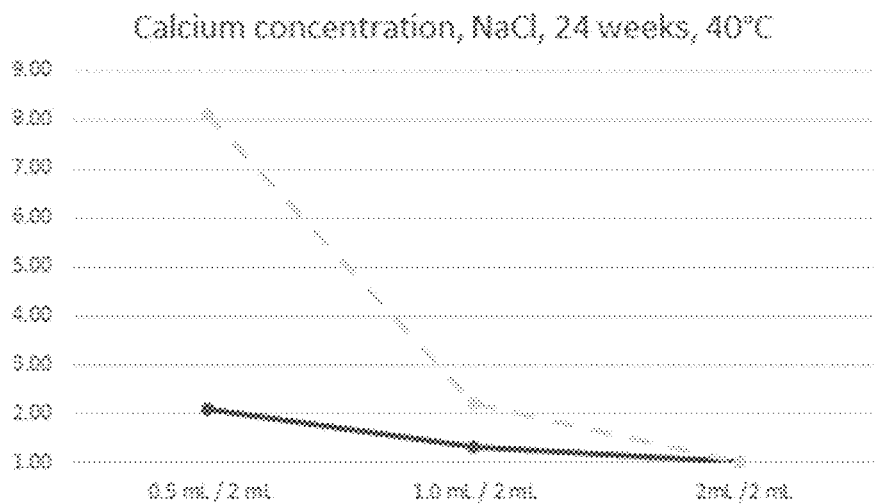
Figure 16:
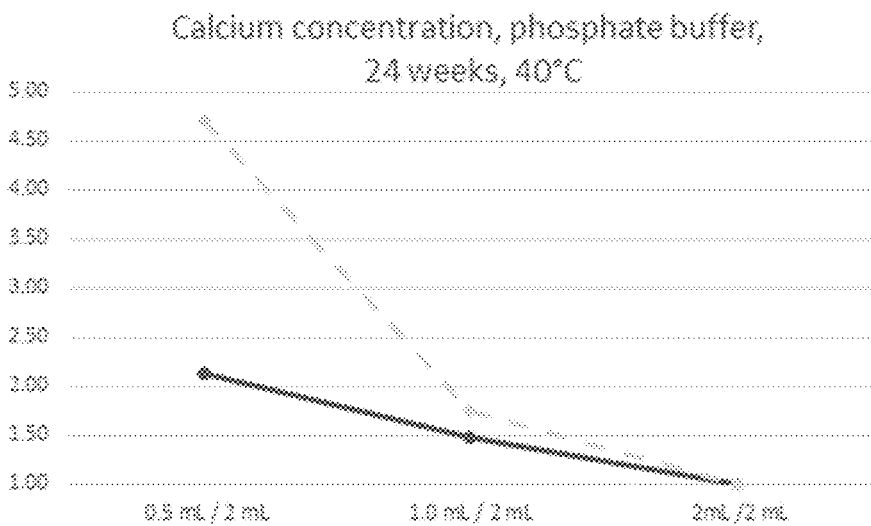
Figure 17:
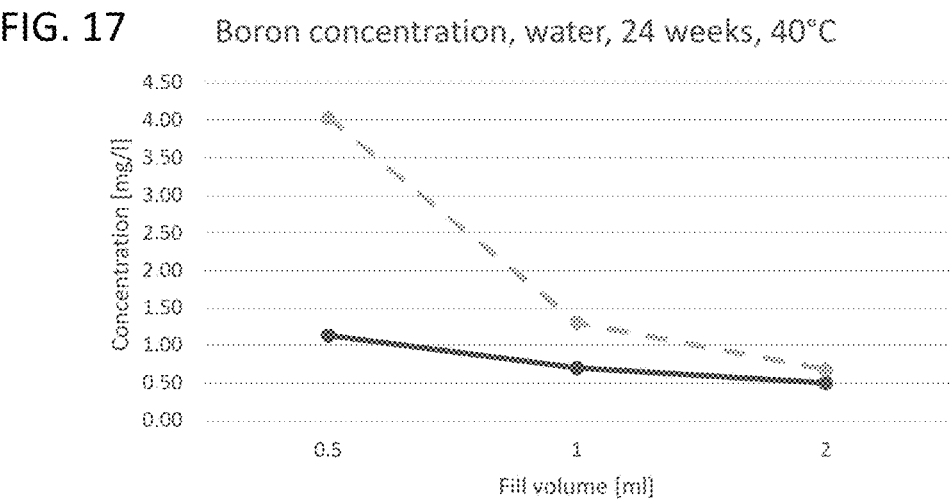
FIG. 17 to FIG. 21 illustrate the leached-out boron ion concentration of a working example and of a glass vial known from the prior art with different liquids as leaching medium.
Figure 18:
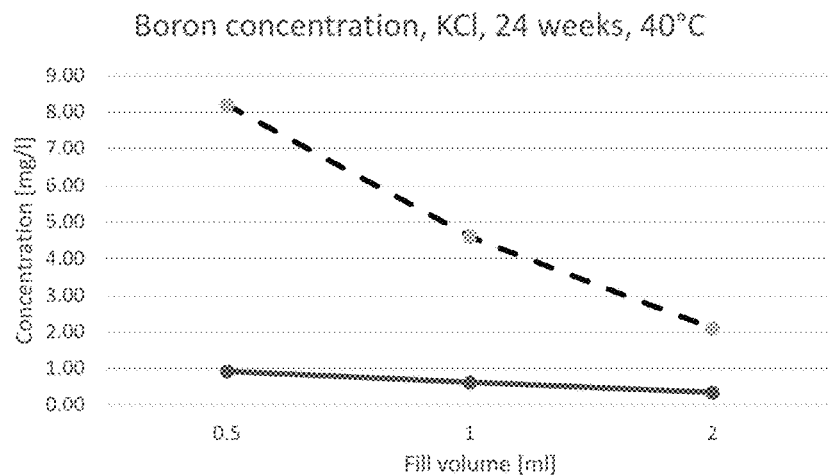
Figure 19:
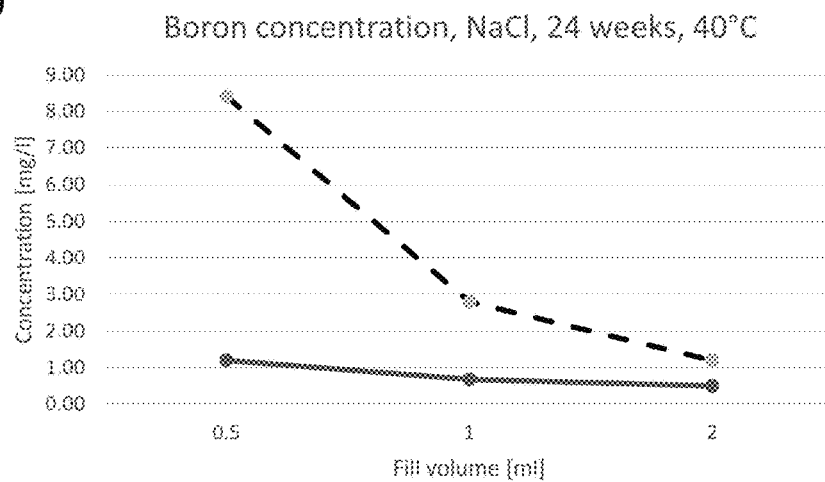
Figure 20:
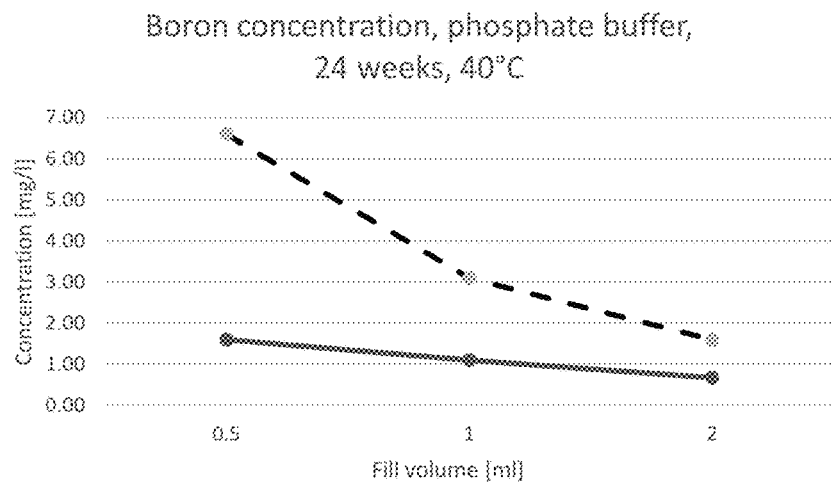
Figure 21:
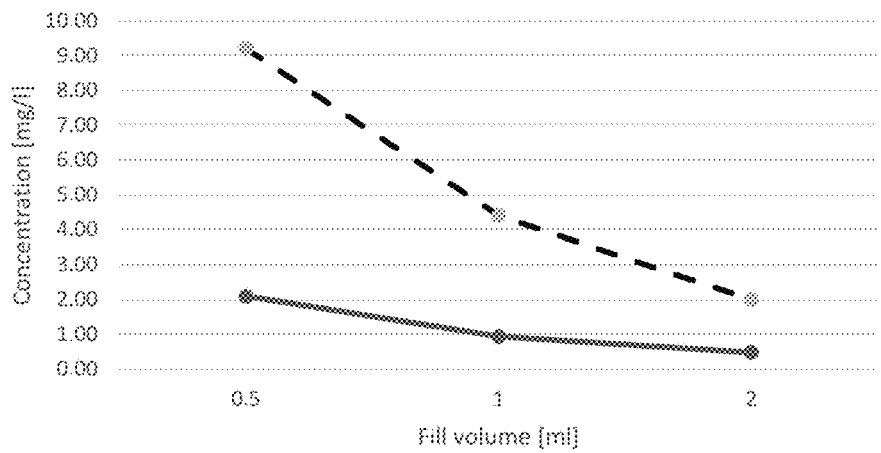
Figure 22:
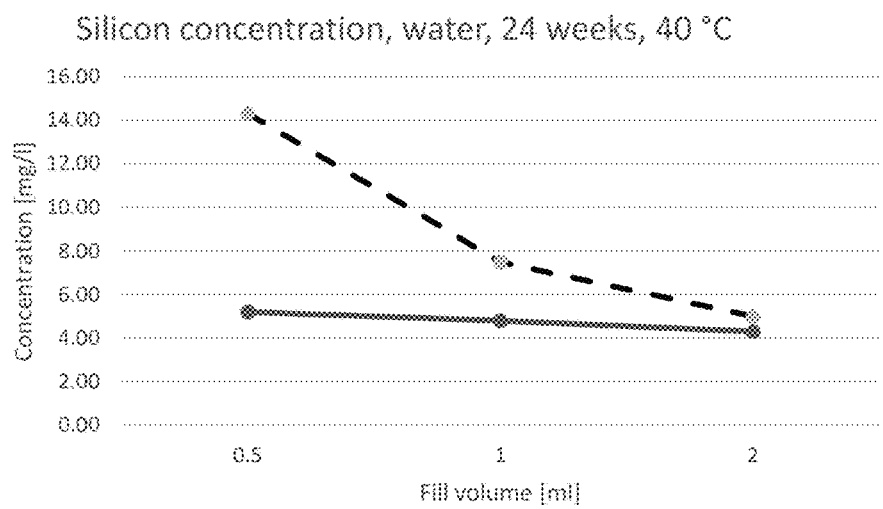
FIG. 22 to FIG. 26 illustrate the leached-out silicon concentration of a working example and of a glass vial known from the prior art with different liquids as leaching medium.

Similar leaching characteristics are also observed for the glass constituents silicon, sodium and calcium. Thus, it becomes clear from FIGS. 6 to 16 too that the migration load that emanates from the near-base wall region through release of the glass constituents in the working example (solid line) is much lower than in the comparative example (dotted line). This becomes clear, for example, from the leaching characteristics of silicon in the different leaching media (FIGS. 6 to 10). Thus, FIG. 8 shows that, in the working example, the concentration ratio of 0.5 mL to 2 mL is actually less than 1.5, whereas the comparative example shows a ratio of more than 5. A concentration ratio of 0.5 mL to 2 mL of less than 1.6 means, in respect of the glass vials used, that the leaching intensity at a fill volume of 0.5 mL is actually less than the leaching intensity at a fill volume of 2 mL.

FIGS. 17 to 31 show the ascertained concentrations of the leached-out glass constituents in various leaching media of working example and comparative example.

Figure 23:
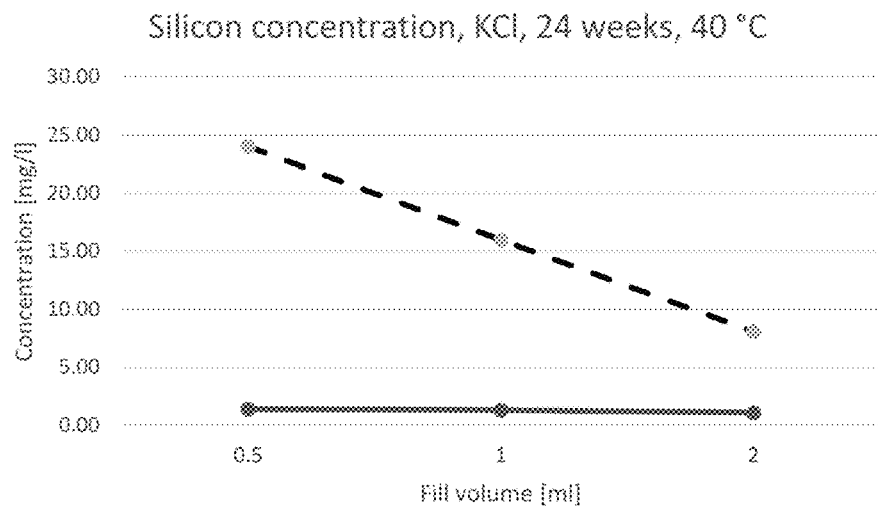
Figure 24:
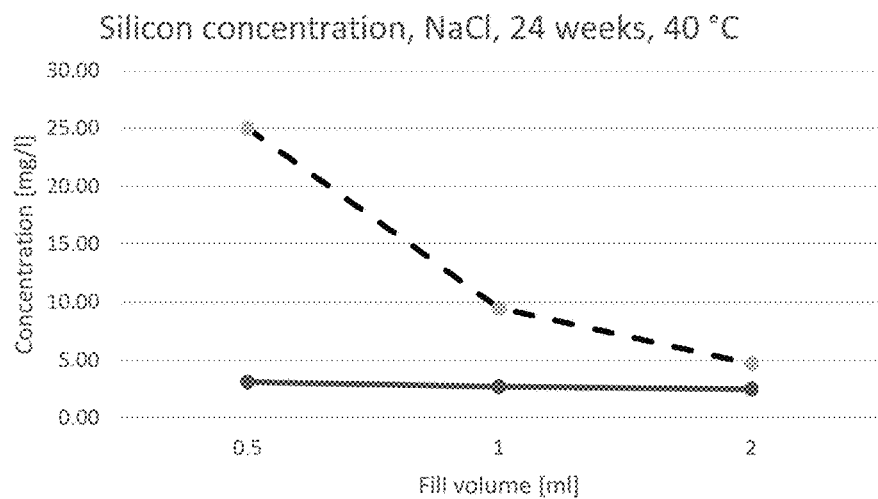
Figure 25:
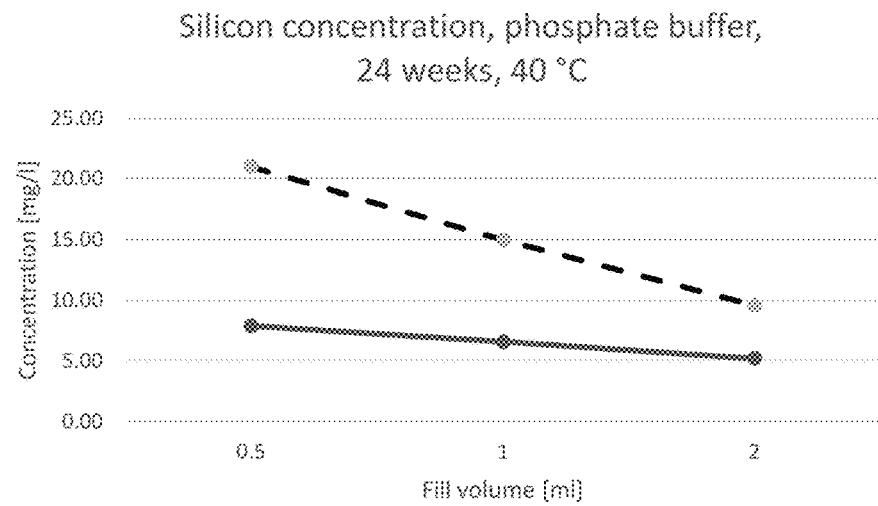
Figure 26:
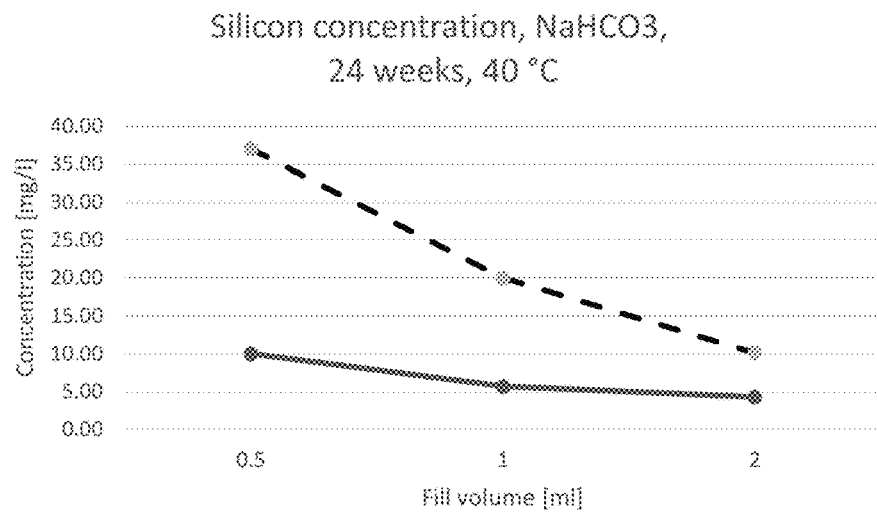
Figure 27:
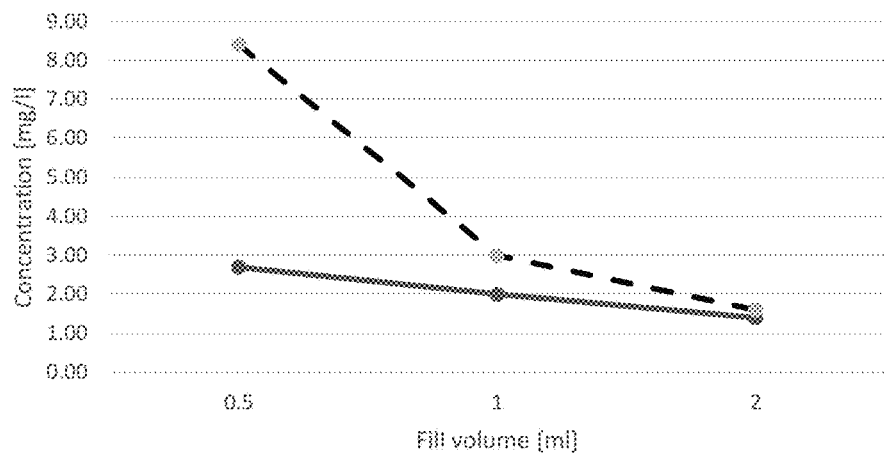
FIG. 27 to FIG. 28 illustrate the leached-out sodium ion concentration of a working example and of a glass vial known from the prior art with different liquids as leaching medium.
Figure 28:
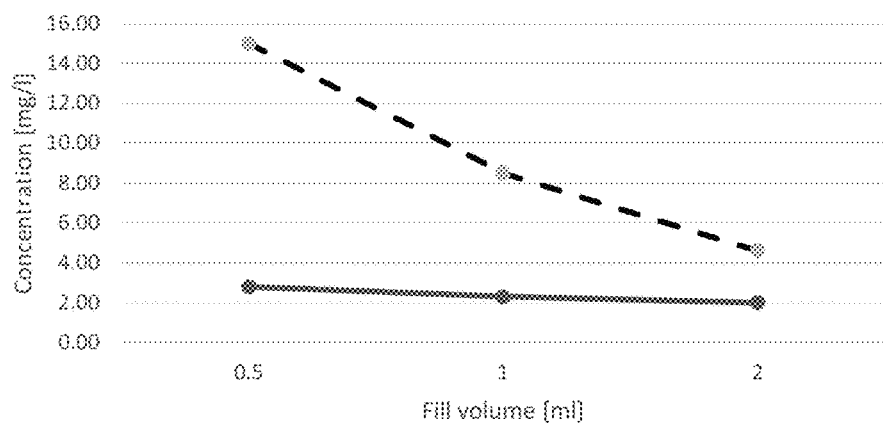
Figure 29:
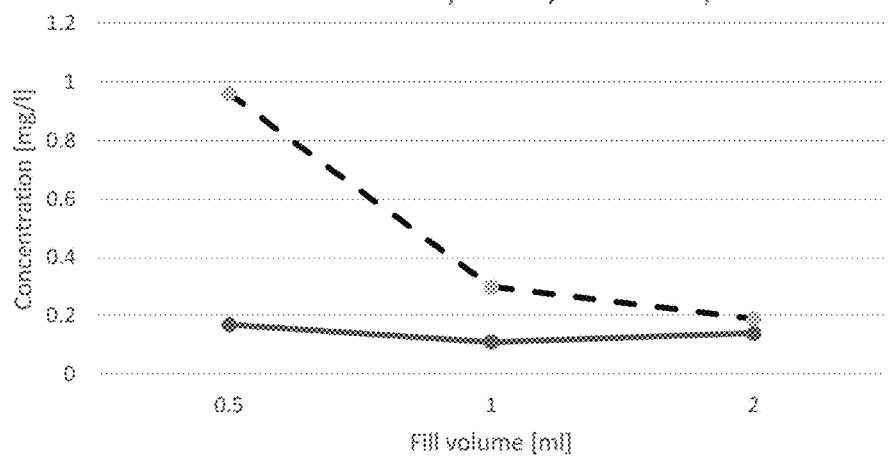
FIG. 29 to FIG. 30 illustrate the leached-out calcium ion concentration of a working example and of a glass vial known from the prior art with different liquids as leaching medium.
Figure 30:
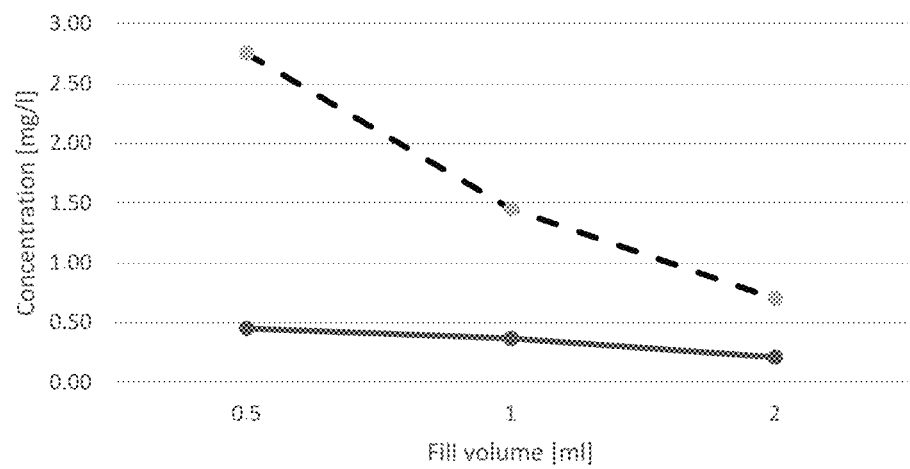
Figure 31:
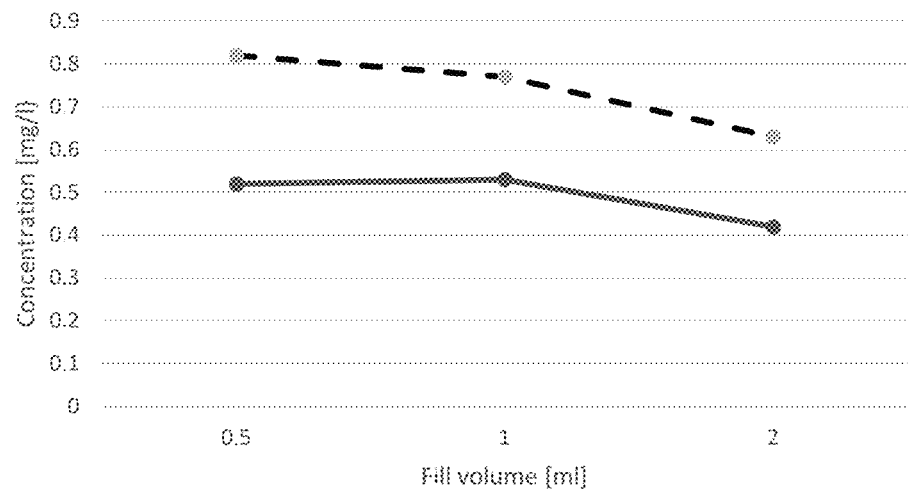
FIG. 31 illustrates the leached-out aluminum ion concentration of a working example and of a glass vial known from the prior art in the case of leaching with water.

The greatest difference between working example and comparative example can be observed in the case of glass vials filled with KCl with a fill volume of 0.5 mL (FIGS. 18, 23, 28, 30). FIG. 23 shows here that the silicon concentrations differ by a factor of about 16.

After storage at 40° C. for t2=48 weeks, the working example showed superior chemical stability to the comparative example, especially when the glass vials were filled with a low fill volume. This effect was observed for all solutions used as filling: processed water, 0.9% NaCl, phosphate-containing buffer solution, 8.4% $NaHCO_3$ and 15% KCl, and in the case of glass vials with and without steam sterilization.

For all the leaching media shown and leached-out constituents, in the comparative example, both as described above and shown in FIGS. 2 to 16, the concentration ratio of 0.5 mL to 2 mL is greater than in the working example, as are the measured concentrations of the respective leached-out glass constituents. This means that, in the working example, the migration load is lower overall than in the comparative example. This difference is here not just restricted to the near-base wall regions but also exists in upper wall regions that are represented by the fill volume of 2 mL.

Figure 32:
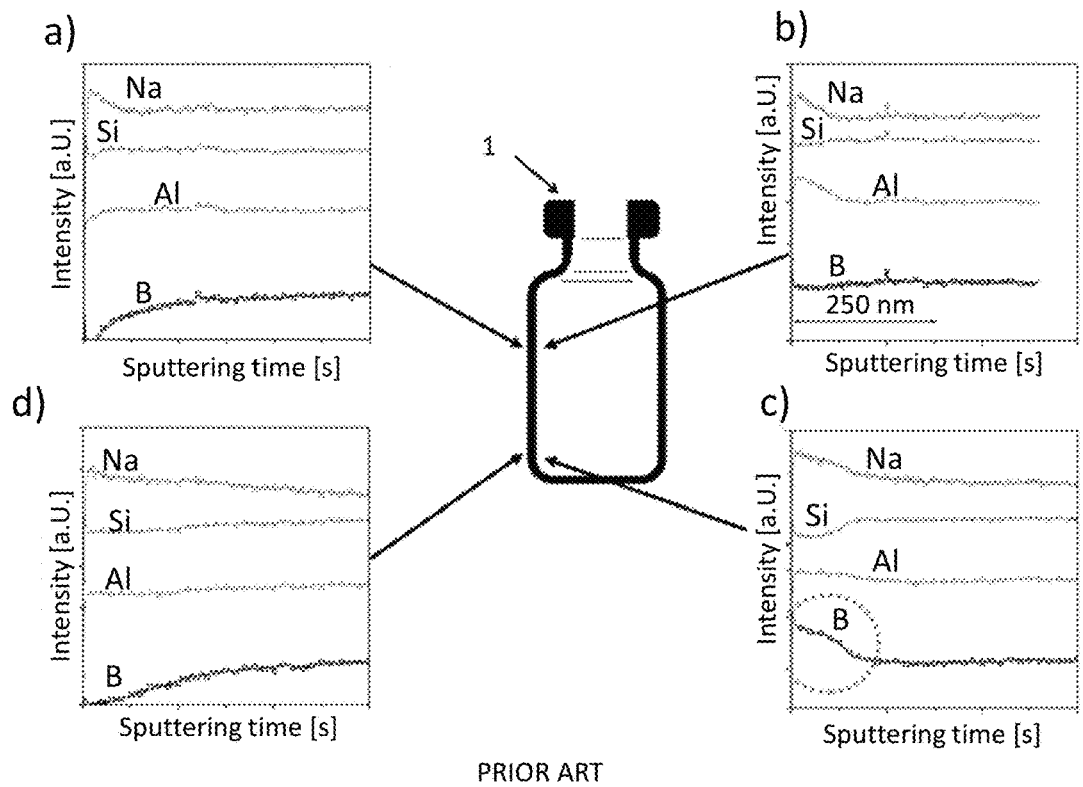
FIG. 32 illustrates SIMS intensity/depth profiles of different regions of a glass vial known from the prior art.

FIG. 32 shows the depth profiles, ascertained by SIMS on a comparative example, of the glass constituents boron, sodium, aluminum and silicon. Depth profiles were measured here at four different sites in the glass vial, namely on the outer wall in an unformed upper wall region of the vial (a)), on the inner wall in an unformed upper wall region of the vial (b)), on the inner wall in a near-base wall region (c)), and on the outer wall in a near-base wall region (d)). The sputtering times plotted in the x-axis of the diagram are a measure of the respective glass depth. Thus, high sputtering times can be attributed to deep regions in the glass.

In the profiles b) from the unformed wall regions, the sodium signal is significantly elevated at low sputtering times and hence in the near-surface glass regions, whereas there is essentially no excess increase for the other glass constituents. It can be concluded from this that predominantly sodium ions are released in the unformed wall regions. Thus, in these regions, the majority of the migration load is formed by the sodium ions released.

Depth profiles c) from the near-base wall regions show not only an increase in the sodium ion signals in near-surface glass regions but also a distinct excess increase in the boron signals in these regions. A significant excess increase in the boron signals in near-surface regions here does not just lead to an elevated migration load by leached-out boron ions; the increase in concentration can also result in near-surface phase separation of the glass, which can lead to reduced chemical stability.

Figure 33:
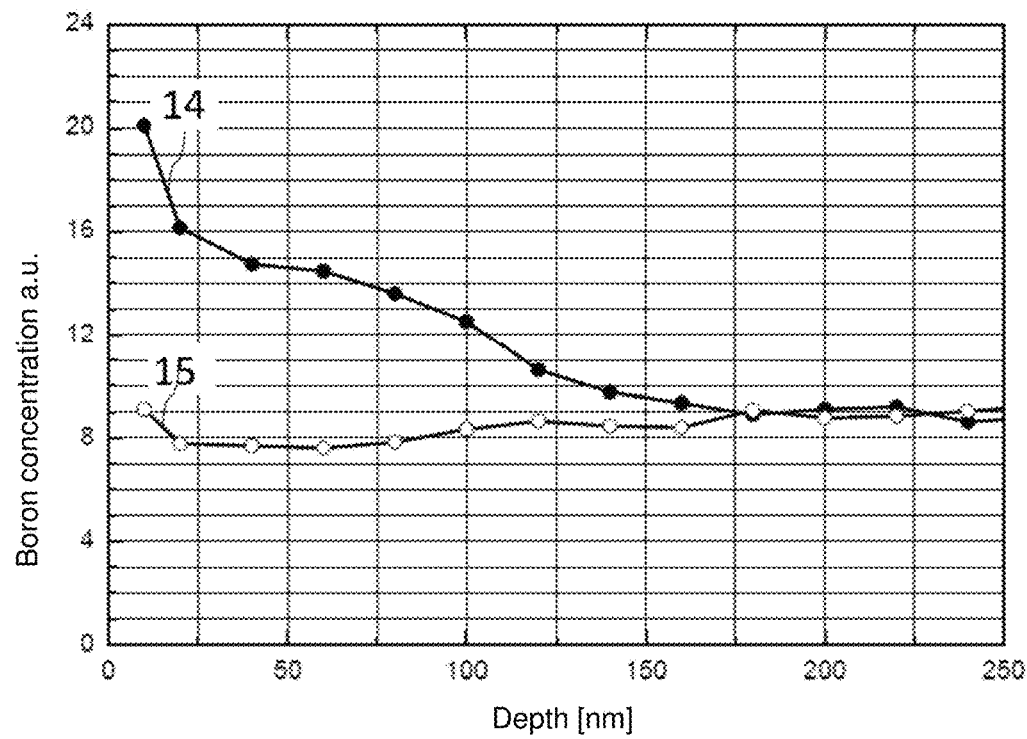
FIG. 33 illustrates SIMS concentration profiles for boron ions from the near-base wall region of a glass vial provided according to the present invention and of a glass vial known from the prior art.

FIG. 33 shows the concentration depth profiles of boron in a near-base wall region of a working example (curve 2) and of a comparative example (curve 1). It becomes clear that the excess increase in the boron ion concentration in the working example is much smaller than in the comparative example. Over and above a depth of about 200 nm, the two glasses show a comparable plateau value for the boron ion concentration.

While the working example, however, at a depth in the range from 10 to 30 nm shows an excess increase in the boron concentration of less than 15% compared to the plateau value for the boron concentration over and above a depth of 150 nm, the comparative example shows a corresponding excess increase in concentration of more than 100%. Moreover, the boron concentration falls less significantly than in the working example, and so the plateau value for the boron ion concentration is not attained until a depth of about 150 nm, whereas the plateau value is already attained at a depth of 100 nm in the working example.

Details of a possible production process for the glass vials of the present invention are shown in FIGS. 34A to 34D. This process comprises at least the following steps:
local heating of one end of a glass tube,
the removing of the locally heated end of the glass tube to form the glass vial having a closed base, and
further forming of the base of the glass vial.

The glass vial formed, such as after being separated from the glass tube, is held upside down and, during the further forming of the base, purged through with the aid of a purge gas, such that a purge gas flow is generated within the glass vial. It has been found to be advantageous when the purge gas flows in or out centrally through the entry opening and out or in eccentrically.

FIGS. 34A-34D show four phases of a purging operation in some embodiments of the above-described production process. The individual phases during the further forming of the bases of the glass vials are described hereinafter:
first phase (cf. FIG. 34A): start of the purging process, in which phase a purge gas flow 50 is first built up within the glass vessel, and in which the purge gas flowing out of the tube 200 is blown at an appropriate pressure into the interior of the glass vial 100, such that this incoming purge gas flow component 51 at first bears against the hot gas 54 in the base zone of the glass vessel.
second phase (cf. FIG. 34B): forming a cleaning purge gas flow component 52, where this cleaning purge gas flow component 52 forms in a semicircle between the hot gas 54 at the base zone of the glass vessel and the incoming purge gas flow component 51 close to the glass vial base. This phase begins immediately after the first phase, which especially depends on the pressure of the incoming purge gas and the geometric conditions in the environment of the front end of the tube and the entry opening.
third phase (cf. FIG. 34C): forming an exiting purge gas flow component 53, where this exiting purge gas flow component 53 interacts to a minimal degree at most with the incoming purge gas flow component 51 and the cleaning purge gas flow component 52 and especially does not cause any turbulences, such that the contaminated hot purge gas 54 is blown or sucked out of the glass vial.
fourth phase (cf. FIG. 34D): ending the purge process, where the pressure of the incoming purge gas 50 is reduced and the last impurities are purged out of the glass vial.

As can be appreciated from FIGS. 34A to 34D, the purge gas flow 50 initially mixes with the hot gas 54, which may contain evaporated borates and other constituents of the glass, as shown in FIG. 34A. As further purge gas flows into the forming vial, designated as the incoming purge gas flow component 51, the high pressure incoming purge gas flow component 51 forms a relatively high-pressure gas zone within the vial while the cleaning purge gas flow component 52, which has re-directed off a bottom base of the glass vial and constitutes purge gas 50 mixed with the hot gas 54, flows around the relatively high-pressure gas zone. Further amounts of incoming purge gas flow component 51 forces the cleaning purge gas flow component 52 toward the opening of the vial until the cleaning purge gas flow component 52 exits the vial as the exiting purge gas flow component 53. Due to the mixing of the hot gas 54, which may contain evaporated borates and other constituents of the glass, with the cleaning purge gas flow component 52, which subsequently leaves the glass vial as the exiting purge gas flow component 53, evaporated borates and other constituents of the glass that may leach out of the glass (if allowed to diffuse into the glass and cool during forming) are removed by the purge gas 50, 51, 52, 53 during forming of the vial. The resulting glass vial is less susceptible to leaching of glass constituents into liquid that is held in the vial, especially at the base of the vial where there is a large surface area of glass in constant contact with the liquid regardless of the fill volume of the vial. Further, the effect of glass constituents leaching into liquid at low fill volumes is especially reduced because the surface of the base of the vial, which has a relatively high surface area and is generally always in contact with the liquid regardless of fill volume, is highly depleted of boron and other constituents that can leach into the liquid.

Figure 36:
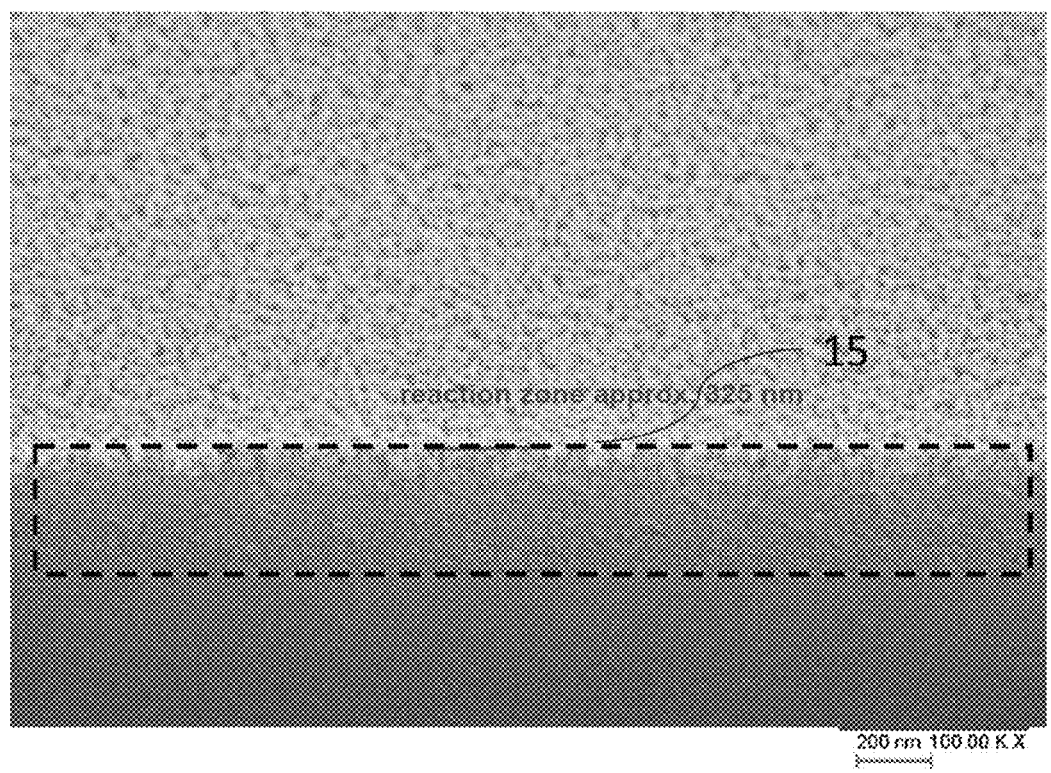
FIG. 36 is an SEM cross-sectional image of the near-base region of a glass vial known from the prior art.

FIGS. 35 and 36 show cross-sectional SEM analyses in the wall in the near-base wall region for a selected working example (FIG. 35) and a comparative example (FIG. 36). Both vials were filled beforehand with 0.5 mL of an NaCl solution and left to stand at 40° C. for 48 weeks.

FIG. 35 shows the homogeneous structure of the glass in the working example. No major surface defects are apparent; the glass in the cross-sectional region examined has no structural peculiarities. By contrast, the glass in the comparative example has a porous layer that extends down to a depth of about 325 nm (reaction layer 16). This layer has resulted from the interaction of the NaCl solution with the phase-separated glass layer. The resultant microscale roughness can also be regarded as a sign of glass corrosion. In the comparative example, the near-base wall region is altered by the phase separation.

In the working example, by contrast, no such phase separation occurs, which leads to the high chemical stability and comparatively low migration load even in the near-base wall regions.

The high chemical stability can also be illustrated with the aid of the "quick test". In general, the quick test gives information as to the extent to which a reaction layer has formed from the inner wall of a glass vial. A reaction layer generally leads to lower chemical stability and to an elevated tendency to layer detachment. An indicator of the risk of layer detachment here is the amount of sodium oxide leached out of the glass vial under the standardized test conditions.

In this case, glass vials with different nominal volumes were stressed by two different methods of steam sterilization and the release of sodium from the inner surface was measured. The test was effected taking account of the standards "European Pharmacopoeia", chapter 3.2.1, and ISO 4802-2.

The empty glass vials were stressed by steam sterilization with the base upward, so as to result in interaction with the inner atmosphere at 121° C. for 240 minutes. Subsequently, the glass vials, depending on the nominal volume, are filled with the given fill volume and again sterilized with steam. This is done at 121° C. for 120 minutes. The release of sodium is measured by flame atomic absorption spectroscopy according to ISO 4802-2.

The following reagents were used:
P water: processed water with conductivity <5 μS/cm at 25° C.
P1 test water: freshly processed water with conductivity <1 μS/cm at 25° C.
Cesium chloride (CsCl): superpure Merck, No. 1.02039.0250
Hydrochloric acid, superpure c(HCl) 0 30%, Merck No. 1.00318.1000
Hydrochloric acid, c(HCl) 0 6 mol/l, 635 mL of the hydrochloric acid c(HCl)=30% must be diluted to 1000 mL with P1 test water. Shelf life: 12 months
Spectrochemical buffer solution: dissolving 80 g of CsCl in about 500 mL of P1 test water, adding 10 mL of hydrochloric acid superpure and making up to 1000 mL with P1 test water. Shelf life: 12 months
Standard sodium solution, c(Na)=1000 mg/l, Merck No. 1703563 (ready to use); alternatively Merck No. 1.09927.0001 (Titrisol ampoule, use as described on the pack, washed and made up to 1000 mL with P1 test water. Shelf life: 12 months
Stock sodium solution, c(Na)=100 mg/l, 100 mL of the stock sodium solution must be diluted to 1000 mL with P1 test water. Shelf life: 3 months
Calibration standards for the sodium measurements: In each plastic standard 100 mL flask, the following volumes of the stock sodium solution and of the spectrochemical buffer solution must be transferred using a pipette and made up to 100 mL with P1 test water.

TABLE 21

Calibration standards

| | Standard 1 | Standard 2 | Standard 3 | Standard 4 | Standard 5 |
|---|---|---|---|---|---|
| Concentration | 0 mg/l | 1 mg/l | 2 mg/l | 4 mg/l | 5 mg/l |
| Volume of stock solution | 0 mL | 1 mL | 2 mL | 4 mL | 5 mL |
| Spectrochemical buffer solution | 5 mL | 5 mL | 5 mL | 5 mL | 5 mL |

The fill volume depends on the tube diameter that was used for the respective glass vials.

TABLE 22

Fill volumes for vessels that were produced from tubes with different diameters

| Outer diameter of vessel body Ø mm | Quick test Fill volume mL | Article or nominal volume | Number of vials that were taken together for the measurement |
|---|---|---|---|
| 16.00 | 1.00 | 2 R | 2 |
| 20.50 | 3.00 | | 1 |
| 22.00 | 3.50 | 6 ( 8 R | 1 |

Before the test, each vessel is filled to the rim with P or P1 water at 50° C. (±5° C.) and left to stand for 20 minutes. Subsequently, the vessels are emptied and each vessel is rinsed three times with P1 water at room temperature 20° C. (±5° C.). It should be noted that the water temperatures should be checked with a thermometer.

In a first phase, the empty vessels are stressed by steam sterilization: Immediately after the cleaning, the glass vials are arranged in the steam sterilizer in such a way that the vessels stand with the base upward in order to allow permanent exchange with the atmosphere of the steam sterilizer. The thermocouple of the steam sterilizer is disposed in the air in the tank. In the case of steam sterilizers according to ISO 4802-2, the steam sterilizer is heated to 100° C. The steam is to escape from the bleed valve for 10 minutes. Then the bleed valve is closed and the temperature is increased from 100° C. to 121° C. at a rate of 1° C. per minute. Subsequently, the temperature is kept at 121±1° C. for 240±1 minutes. Then the temperature is lowered from 121° C. to 100° C. at a rate of 0.5° C. per minute, and the system is vented. The vessels are subsequently removed from the steam sterilizer taking the normal precautionary measures and cooled down solely in air.

The vials are then filled with P1 water according to Table 21. Each individual vessel is to be closed loosely with a piece of aluminum foil that has been rinsed with P1 water beforehand. In the case of steam sterilizers according to ISO 4802-2, the steam sterilizer is heated to 100° C. and the steam is to escape from the bleed valve for 10 minutes. Then the bleed valve is closed and the temperature is increased from 100° C. to 121° C. at a rate of 1° C. per minute. Subsequently, the temperature is kept at 121±1° C. for 120±1 minutes. Then the temperature is lowered from 121° C. to 100° C. at a rate of 0.5° C.; the system should be vented here to avoid the formation of a vacuum. The steam sterilizer must not be opened before it has cooled down to 95° C.

The vials are cooled by air ventilation and the samples are prepared for the FAAS measurement. For this purpose, a volume of the spectrochemical buffer solution corresponding to 5% of the fill volume is added to each vial and then mixed in the glass vial by stirring in the solution. Subsequently, the glass vials are completely emptied and the extraction solutions are introduced into a plastic tube and admixed with the spectrochemical buffer solution. The volume of the spectrochemical buffer solution added corresponds to 5% of the total volume added.

The sodium release is determined by FAAS as follows: The extraction solution is sucked from the plastic tube directly into the flame of the atomic absorption instrument and the approximate concentration of sodium oxide is determined by reference to the calibration graph that has been determined by means of the reference solutions of suitable concentration. Subsequently, the average of the sodium concentration found in each sample tested is calculated, in micrograms of sodium oxide $Na_2O$ per milliliter of extraction.

$Na_2O$ [mg/l]=Na [mg/l]×1.348×1.05

(Factor Na–$Na_2O$=1.348; dilution factor=1.05)

The glass vials provided according to the present invention, depending on their volume, have sodium oxide concentrations within the limits according to Table 23.

TABLE 23

Limits for the Na2O content defined by vessel type.

| Vessel body Ø mm | Fill volume mL | Article or nominal volume | Limit for quick test Na2O content mg/l |
|---|---|---|---|
| 16.00 | 1.00 | 2 R | 4.5 ± 0.3 |
| 22.00 | 3.50 | 10 R | 2.7 ± 0.2 |
| 24.00 | 4.00 | 50 R | 2.5 ± 0.2 |

In some embodiments, the sodium oxide concentration ascertained by the above-described quick test is less than 5 mg/l in the case of a glass vial having a nominal volume of 2 mL. The sodium oxide concentration here is a measure of the risk of detachment of a reaction layer from the inner wall of the glass vial and shows the high chemical stability of the glass vial of the present invention.

Figure 37:
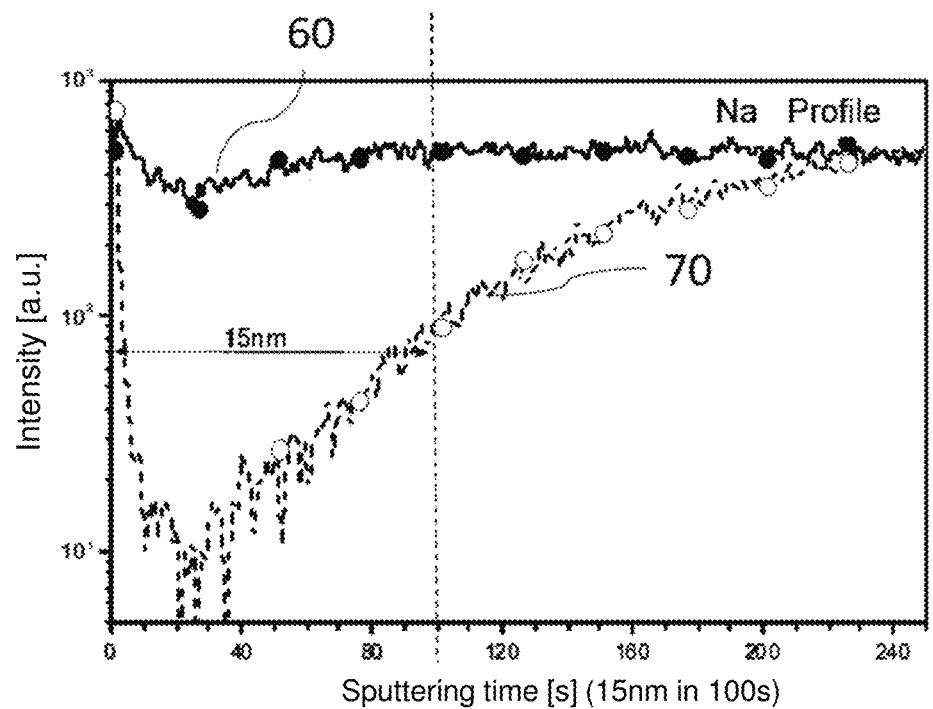
FIG. 37 and FIG. 38 are SIMS intensity/depth profiles for boron and sodium from an upper wall region and a base of a glass vial provided according to the present invention and a glass vial known from the prior art.
Figure 38:
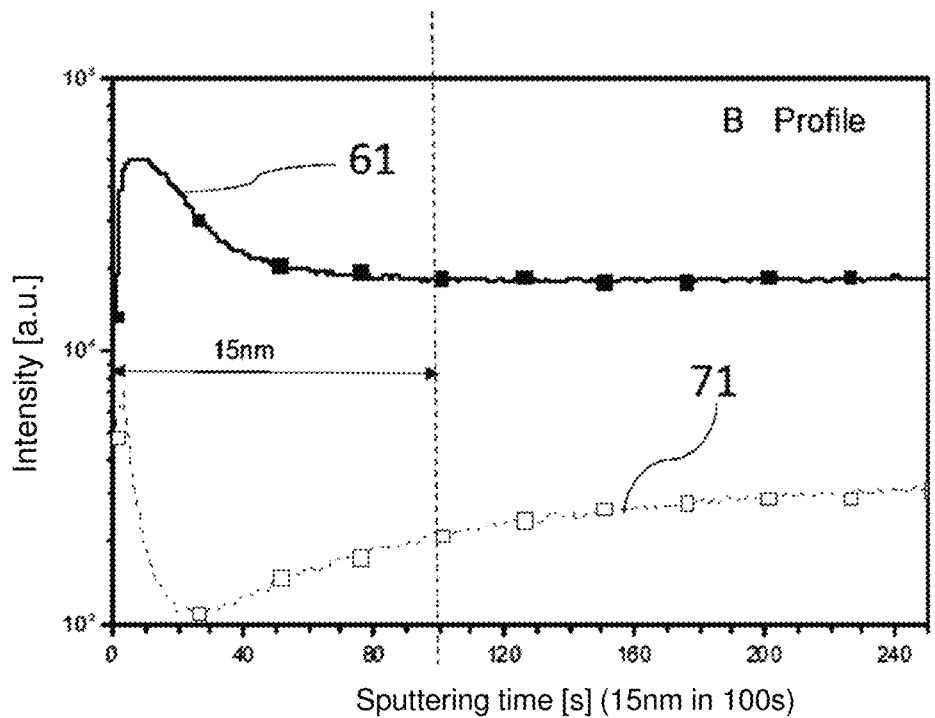

FIG. 37 shows the depth profiles of sodium signals from the upper wall region 60 and from the base 70 of a glass vial down to a depth of about 35 nm. It becomes clear that there is significant depletion of sodium in the near-surface glass layer in the base. FIG. 38 shows the depth profiles of boron signals from the upper wall region 61 and from the base 71 of a glass vial down to a depth of about 35 nm. Very significant depletion of boron in the near-surface glass layer is apparent here compared to a comparable glass layer from an upper wall region.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

LIST OF REFERENCE NUMERALS 1 glass vial
2 vial neck
3 base
4 liquid
5 upper wall region
6 lower wall region
7 inner wall of the base
9 fill volume
10 vial neck
11 volume to rim
12 middle plane
13 underside of base
14 conventional vial
15 vial in some embodiments
16 reaction zone
20 inner wall
21 outer wall
50, 51, 52, 52 purge gas flow
54 hot zone
60, 61 concentration/depth profile of comparative vial
70, 71 concentration/depth profile of working example
200 tube

What is claimed is:

1. A glass vial, comprising: a base and a vial opening, the base comprising a boron-containing multicomponent glass, the glass vial holding a liquid active pharmaceutical ingredient formulation, the glass vial having a total volume of <4.5 mL, a filling level of the glass vial with the active pharmaceutical ingredient formulation is not more than 0.25 and a concentration of boron ions, measured at a measurement site below a plane of a middle of the glass vial using a concentration depth profile at a depth in a range from 10 to 30 nm, has a value, averaged over measurements of the concentration depth profile, that has an excess increase of not more than 30% compared to a concentration of boron ions measured using a concentration depth profile at a depth in a range from 10 to 30 nm with a measurement site in the plane of the middle of the glass vial, where the position of the plane of the middle of the glass vial is determined from an underside of the base of the glass vial in a direction of the vial opening.

2. The glass vial of claim 1, wherein the concentration of boron ions, measured at the measurement site below the plane of the middle of the vessel using the concentration depth profile at the depth in the range from 10 to 30 nm, has a value, averaged over the measurements of the concentration depth profile, that has an excess increase of not more than 25% compared to the concentration of boron ions measured using the concentration depth profile at the depth in the range from 10 to 30 nm with the measurement site in the plane of the middle of the vessel.

3. The glass vial of claim 1, wherein the concentration depth profile assumes a plateau value for boron ions from a depth of 150 nm downward.

4. The glass vial of claim 1, wherein the glass of an inner wall of the glass vial is monophasic down to a depth of at least 200 nm.

5. The glass vial of claim 1, wherein a surface of an inner wall of the glass vial at least one of does not have any coating or has not been etched.

6. The glass vial of claim 1, wherein the liquid active pharmaceutical ingredient formulation contains at least one of a therapeutic protein, a monoclonal antibody, or a vaccine.

7. The glass vial of claim 1, further comprising a seal.

8. The glass vial of claim 7, wherein the seal is a sterile seal.

9. The glass vial of claim 1, further comprising a side wall connected to the base, the glass comprising $SiO_2$, the glass at the base at an inner wall has a composition having a higher SiO2 content than at the side wall and at a transition of the side wall to the base.

10. The glass vial of claim 9, wherein a concentration of silicon ions, measured at a measurement site on an inside of the base of the glass vial using a concentration depth profile at a depth in a range from 5 to 15 nm, has a value, averaged over measurements of the concentration depth profile, that has an excess increase of at least 10% compared to a concentration of silicon ions measured using a concentration depth profile at a depth in a range from 5 to 15 nm with a measurement site in the plane of the middle of the glass vial.

11. The glass vial of claim 9, wherein a concentration of sodium ions, measured at a measurement site on an inside of the base using a concentration depth profile at a depth in a range from 5 to 15 nm, has a value, averaged over measurements of the concentration depth profile, that has a decrease at least by a factor of 1.5 compared to a concentration of sodium ions measured using a concentration depth profile at a depth in a range from 5 to 15 nm with a measurement site in the plane of the middle of the glass vial.

12. The glass vial of claim 9, wherein the concentration of boron ions, measured at a measurement site on an inside of the base using a concentration depth profile at a depth in a range from 10 to 30 nm, has a value, averaged over measurements of the concentration depth profile, that has a decrease at least by a factor of 3 compared to a concentration of boron ions measured using a concentration depth profile at a depth in a range from 10 to 30 nm with a measurement site in the plane of the middle of the glass vial.

13. The glass vial of claim 9, wherein a surface of an inner wall of the glass vial at least one of has no coating or has not been etched.

14. The glass vial of claim 9, wherein the glass of an inner wall of the glass vial is monophasic down to a depth of at least 200 nm in a near-base wall region.

15. The glass vial of claim 9, wherein the liquid active pharmaceutical ingredient formulation comprises at least one of a therapeutic protein, a monoclonal antibody, or a vaccine.

16. The glass vial of claim 9, wherein the filling level is not more than 0.125.

17. The glass vial of claim 1, wherein the filling level is not more than 0.125.

18. The glass vial of claim 1, wherein the glass vial has a nominal volume in a range from 1 mL to 2 mL.

19. A glass vial, comprising: a base, a side wall connected to the base, and a vial opening, the base and the side wall comprising a multicomponent glass, the glass vial holding a liquid active pharmaceutical ingredient formulation, the glass comprising $SiO_2$, the glass vial having a total volume of <4.5 mL, a filling level of the glass vial with the active pharmaceutical ingredient formulation is not more than 0.25, the glass at the base at an inner wall has a composition having a higher $SiO_2$ content than at the side wall and at a transition of the side wall to the base.

* * * * *